US010256706B2

(12) United States Patent
Uematsu et al.

(10) Patent No.: US 10,256,706 B2
(45) Date of Patent: Apr. 9, 2019

(54) MOTOR PROVIDED WITH NONCIRCULAR STATOR CORE, APPARATUS FOR PRODUCTION OF MOTOR, AND METHOD FOR PRODUCTION OF MOTOR

(71) Applicant: FANUC CORPORATION, Yamanashi (JP)

(72) Inventors: Hidetoshi Uematsu, Yamanashi (JP); Yasuo Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 922 days.

(21) Appl. No.: 14/595,313

(22) Filed: Jan. 13, 2015

(65) Prior Publication Data

US 2015/0207390 A1    Jul. 23, 2015

(30) Foreign Application Priority Data

Jan. 17, 2014 (JP) ................. 2014-007259

(51) Int. Cl.
*H02K 1/12* (2006.01)
*H02K 1/16* (2006.01)
(Continued)

(52) U.S. Cl.
CPC .............. *H02K 15/03* (2013.01); *H02K 1/12* (2013.01); *H02K 1/16* (2013.01); *H02K 15/024* (2013.01);
(Continued)

(58) Field of Classification Search
CPC .. H02K 1/02; H02K 1/06; H02K 1/12; H02K 1/14; H02K 1/146; H02K 1/16; H02K 1/165
(Continued)

(56) References Cited

U.S. PATENT DOCUMENTS

2001/0005104 A1    6/2001  Nakahara et al.
2005/0023925 A1    2/2005  Yamamoto et al.
(Continued)

FOREIGN PATENT DOCUMENTS

CN    1819402 A    8/2006
CN    1294685 C    1/2007
(Continued)

OTHER PUBLICATIONS

English Abstract and Machine Translation for Chinese Publication No. 204517513 U, published Jul. 29, 2015, 16 pgs.
(Continued)

*Primary Examiner* — Quyen P Leung
*Assistant Examiner* — Eric Johnson
(74) *Attorney, Agent, or Firm* — Fredrikson & Byron, P.A.

(57) ABSTRACT

A motor which reduces the manufacturing cost while able to reduce the cogging torque. The stator core is provided with a first core sheet and a second core sheet which is stacked with the first core sheet so that its rolling direction becomes a direction rotated from the rolling direction of the first core sheet by exactly an angle of an odd multiple of 360°/(number of poles of motor×2). The outside edge of the first core sheet has a first side and a second side at two sides in a direction perpendicular to the rolling direction. The outside edge of the second core sheet has a third side and a fourth side in a direction perpendicular to the rolling direction. The dimension between the first side and the second side and the dimension between the third side and the fourth side are the same.

5 Claims, 19 Drawing Sheets

(51) Int. Cl.
*H02K 15/03* (2006.01)
*H02K 15/02* (2006.01)

(52) U.S. Cl.
CPC ...... *Y10T 29/49009* (2015.01); *Y10T 83/8737* (2015.04)

(58) Field of Classification Search
USPC ..... 310/216.006, 216.011, 216.055, 216.056
See application file for complete search history.

(56) References Cited

U.S. PATENT DOCUMENTS

| | | |
|---|---|---|
| 2005/0229384 A1 | 10/2005 | Yamamoto et al. |
| 2006/0145563 A1 | 7/2006 | Hans |
| 2012/0248918 A1 | 10/2012 | Itou et al. |

FOREIGN PATENT DOCUMENTS

| | | |
|---|---|---|
| CN | 101039055 A | 9/2007 |
| CN | 204517513 U | 7/2015 |
| EP | 1686674 B1 | 3/2009 |
| JP | H11275781 A | 10/1999 |
| JP | 2001186697 A | 7/2001 |
| JP | 2004350369 A | 12/2004 |
| JP | 2005065479 A | 3/2005 |
| JP | 2012217283 A | 11/2012 |
| WO | 03084030 A1 | 10/2003 |

OTHER PUBLICATIONS

English Abstract for Chinese Publication No. 1294685 C, published Jan. 10, 2007, 1 pg.
English Abstract and Machine Translation for Chinese Publication No. 1819402 A, published Aug. 16, 2006, 14 pgs.
English Translation of Japanese Publication No. 2012217283, published Nov. 8. 2012, 19 pages.
English Translation of Japanese Publication No. 2004350369, published Dec. 9, 2004, 12 pages.
English Translation of Japanese Publication No. 2001186697, published Jul. 6, 2001, 25 pages.
English Translation of Japanese Publication No. H11275781, published Oct. 8, 1999, 10 pages.
English abstract and machine translation for Japanese Publication No. JP 2005-065479 published Mar. 10, 2005, 37 pages.
English Abstract and Machine Translation for Chinese Publication No. 101039055 A, published Sep. 19, 2007, 11 pgs.

FIG. 8A
FIG. 8B
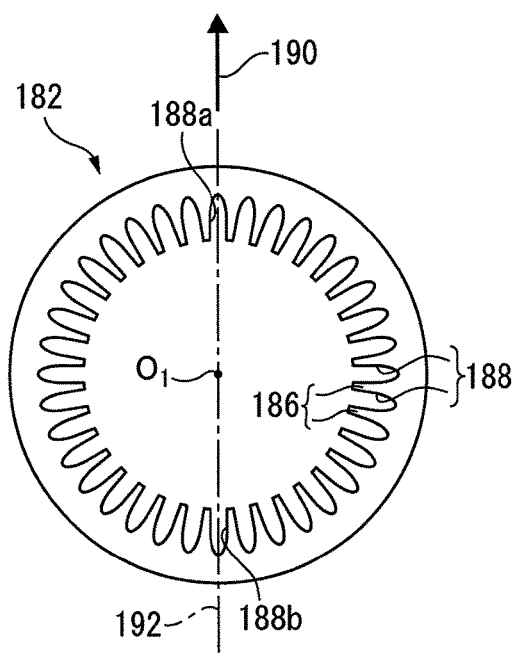
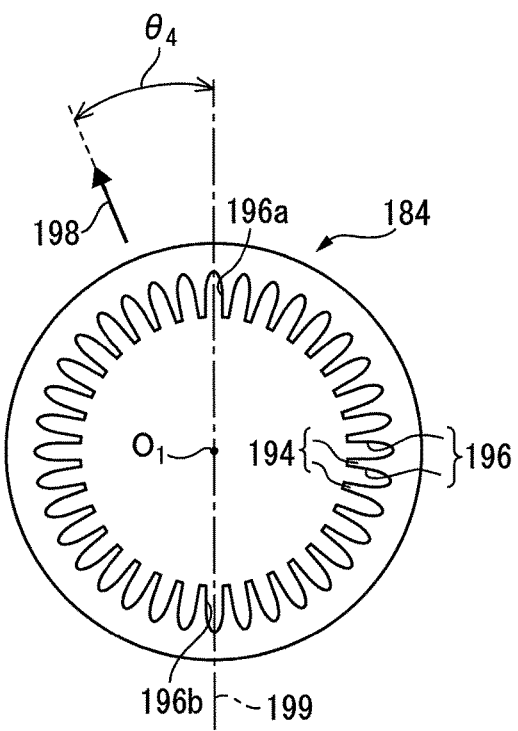

(a)  (b)

(a)  (b)

FIG. 16A
FIG. 16B
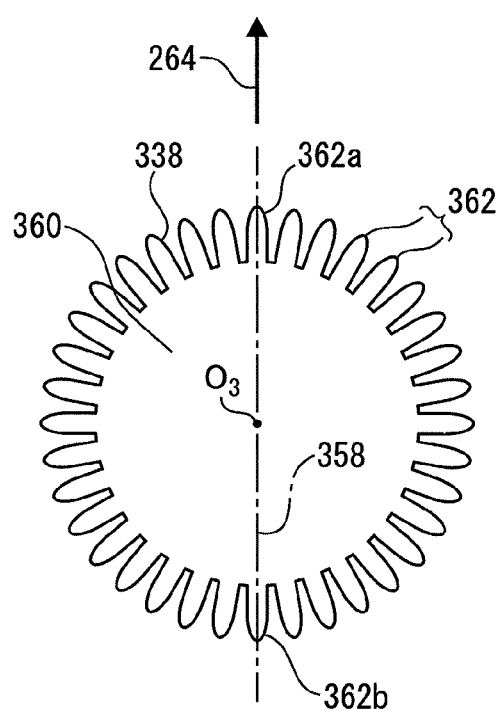
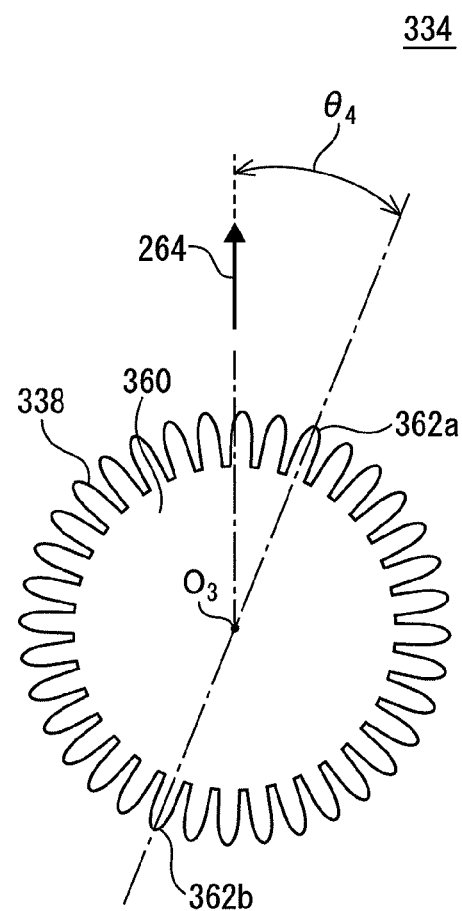

MOTOR PROVIDED WITH NONCIRCULAR STATOR CORE, APPARATUS FOR PRODUCTION OF MOTOR, AND METHOD FOR PRODUCTION OF MOTOR

BACKGROUND OF THE INVENTION

1. Field of the Invention

The present invention relates to a motor which is provided with a stator core which has a noncircular outside shape, an apparatus for production of a motor, and a method for production of a motor.

2. Description of the Related Art

Known in the art is a motor which is provided with a stator core which is comprised of a plurality of stacked core sheets which are comprised of rolled magnetic steel sheets wherein the magnetic steel sheets are stacked with rolling directions made different from each other to thereby reduce cogging torque which is generated due to magnetic anisotropy of the magnetic steel sheets (for example, Japanese Patent Publication No. 2005-65479A).

The above core sheets are generally fabricated by press-working and thereby punching a hoop which is conveyed along its rolling direction. If the magnetic steel sheet which is described in the above patent publication has a regular polygonal outside shape, the maximum dimensions in the direction perpendicular to the rolling direction will differ between core sheets which are stacked so that the rolling directions differ from each other.

For this reason, if considering the case of punching out these core sheets from a common hoop, since the maximum dimension of the hoop in the direction perpendicular to the conveying direction differs, excess parts end up occurring in the hoop corresponding to the fluctuations in the maximum dimensions. Due to this, the amount of the hoop which is discarded ends up increasing. This has led to an increase in the manufacturing costs.

SUMMARY OF THE INVENTION

In one aspect of the present invention, a motor comprises a stator core which is formed by stacking a plurality of noncircular core sheets, each of which is made from a rolled magnetic steel sheet. The stator core includes a first core sheet, and a second core sheet which has an outside edge shape the same as the first core sheet. The second core sheet is stacked with respect to the first core sheet so that a rolling direction of the second core sheet becomes a direction rotated from a rolling direction of the first core sheet about a center axis of the stator core by an angle of an odd multiple of $360°/$(number of poles of the motor$\times 2$).

The outside edge of the first core sheet has a first and second sides at both ends in a direction perpendicular to the rolling direction of the second core sheet, wherein the third and fourth sides are parallel to the rolling direction of the first core sheet. The outside edge of the second core sheet has a third and fourth sides at both ends in a direction perpendicular to the rolling direction of the second core sheet, wherein the third and fourth sides are parallel to the rolling direction of the second core sheet. The dimension in the direction perpendicular to the rolling direction of the first core sheet between the first side and the second side, and the dimension in the direction perpendicular to the rolling direction of the second core sheet between the third side and the fourth side are the same.

Each of the first core sheet and the second core sheet may have a shape which is line symmetric about an imaginary line which radially extends from its center axis to a direction rotated from its rolling direction about the center axis of the stator core by an angle expressed by $(360°\times(a+0.5))/$(number of poles of the motor$\times 2$) where "a" is a whole number.

In another aspect of the present invention, a motor comprises a stator core which is formed by stacking a plurality of core sheets, each of which is made from a rolled magnetic steel sheet. The core sheet includes a noncircular outer sheet which has a hole; and a first and second inner sheets fit into the hole so as to be arranged at radially inside of the outer sheet.

The second inner sheet is stacked with respect to the first inner sheet so that its rolling direction becomes a direction rotated from the rolling direction of the first inner sheet about the center axis of the stator core by a predetermined angle.

Each of the hole, the first inner sheet, and the second inner sheet may have a regular b-gonal shape where "b" is a natural number. This natural number "b" may be one of divisors of the number of slots of the motor whereby the angle expressed by $360°/b$ becomes a value closest to $360°/$(number of poles of the motor$\times 2$).

In this case, the second inner sheet may be stacked with respect to the first inner sheet so that its rolling direction becomes a direction rotated from the rolling direction of the first inner sheet about the center axis of the stator core by an angle of $360°/b$.

Each of the hole, the first inner sheet, and the second inner sheet may be circular. In this case, the second inner sheet may be stacked with respect to the first inner sheet so that its rolling direction becomes a direction rotated from the rolling direction of the first inner sheet about the center axis of the stator core by an angle of $360°/$(number of poles of the motor$\times 2$).

In still another aspect of the present invention, an apparatus for producing a motor comprising a stator core formed by stacking a plurality of core sheets, each of which is made from a rolled magnetic steel sheet, comprises a punch die for punching out the core sheet from a conveyed hoop; and a rotation drive part for rotating the punch die about an axis of the punch die.

The rotation drive part rotates the punch die from a first position to a second position rotated from the first position about the axis of the punch die by a predetermined angle. The punch die includes a punch and a die which receives the punch. The outer circumferential surface of the punch has a first and second flat surfaces at both ends in a direction perpendicular to the conveying direction of the hoop when arranged at a first position, wherein the first and second flat surfaces become parallel to the conveying direction.

The outer circumferential surface of the punch also includes a third and fourth flat surfaces at both ends in a direction perpendicular to the conveying direction of the hoop when arranged at a second position, wherein the third and fourth flat surfaces become parallel to the conveying direction. The die has an inner circumferential surface which corresponds to the outer circumferential surface of the punch. The predetermined angle may be an odd multiple of $360°/$(number of poles of the motor$\times 2$).

In still another aspect of the present invention, the method of producing the motor including the stator core, comprises conveying a hoop along a rolling direction of the hoop; punching out the first core sheet from the hoop; punching out the second core sheet from the hoop; and stacking the first core sheet and the second core sheet each other so that the rolling direction of the second core sheet becomes a direction rotated from the rolling direction of the first core sheet about a center axis of the stator core by an angle of an odd multiple of 360°/(number of poles of the motor×2).

The steps of punching out the first core sheet and punching out the second core sheet may be performed with a punch die. The method may further comprise rotating the punch die about a center axis of the punch die by an angle of an odd multiple of 360°/(number of poles of the motor× 2), before punching out the second core sheet.

In still another aspect of the present invention, the method of producing the motor including the stator core, comprises conveying a hoop along a rolling direction of the hoop; punching out the plurality of core sheets from the hoop; rotating a first core sheet of the plurality of core sheets about the below imaginary line by 180°; and stacking the first core sheet on a second core sheet of the plurality of core sheets. Here, each of the plurality of core sheets has a shape which is line symmetric about the imaginary line which radially extends from its center axis to a direction rotated from the conveying direction of the hoop about the center axis of the core sheet by an angle expressed by (360°×(a+0.5))/(number of poles of the motor×2) where "a" is a whole number.

In still another aspect of the present invention, the method of producing the motor including the stator core, comprises conveying a hoop along a rolling direction of the hoop; punching out the first inner sheet from the hoop; and fitting the first inner sheet into a hole which is formed in the hoop by punching out the first inner sheet. Further, this method comprises punching out a second inner sheet from the hoop; rotating the second inner sheet about a center axis of the second inner sheet; and fitting the rotated second inner sheet into a hole which is formed in the hoop by punching out the second inner sheet.

Further, this method comprises punching out a first outer sheet so as to enclose the hole in which the first inner sheet is fit; punching out a second outer sheet so as to enclose the hole in which the second inner sheet is fit; and stacking the first outer sheet and the second outer sheet each other.

The step of punching out the first inner sheet and the step of punching out the second inner sheet may be performed with a punch die. In this case, the method may further comprise rotating the punch die about a center axis thereof by an angle of an odd multiple of 360°/(number of poles of the motor×2), before punching out the second inner sheet.

Each of the hole, the first inner sheet, and the second inner sheet may have a regular b-gonal shape where "b" is a natural number. In this case, in the step of rotating the second inner sheet about the center axis of the second inner sheet, the second inner sheet may be rotated by an angle expressed by 360°/b about the center axis.

BRIEF DESCRIPTION OF THE DRAWINGS

The above and other objects, features, and advantages of the present invention will become further clearer by the following description of the preferred embodiments given while referring to the attached drawings, in which

FIG. 8A shows the first inner sheet of the stator core shown in FIG. 7A;

FIG. 8B shows the second inner sheet of the stator core shown in FIG. 7A;

FIG. 16A and FIG. 16B are outside views of a punch of the first punch die shown in FIG. 15 as seen from the axial direction thereof;

DETAILED DESCRIPTION

Figure 1:
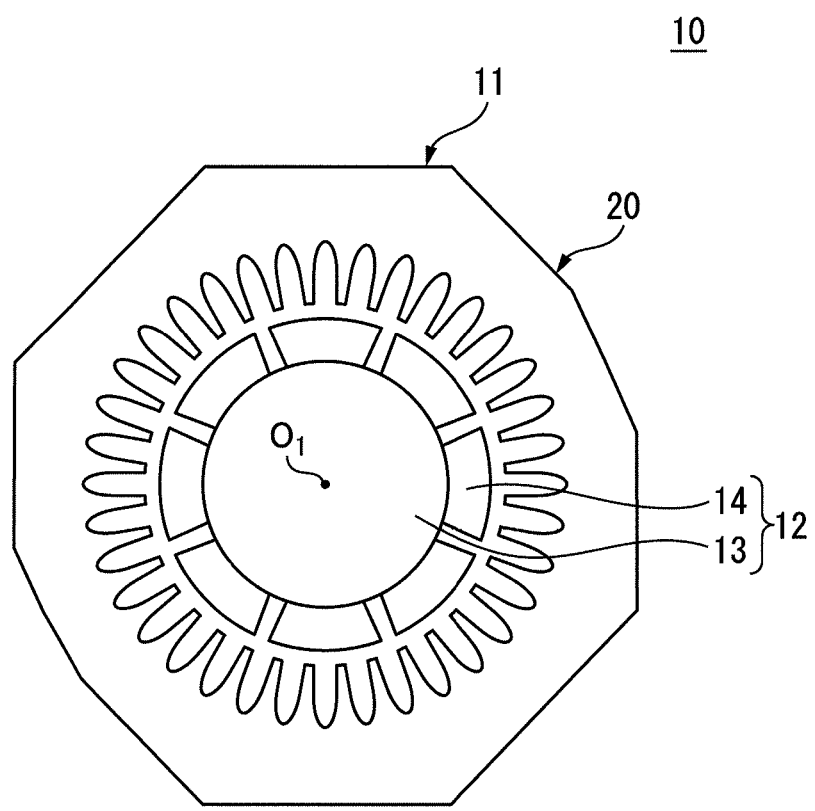
FIG. 1 is an outside view of a motor according to an embodiment of the present invention as seen from an axial direction of the motor.

Below, embodiments of the present invention will be explained in detail based on the drawings. Referring to FIG. 1, a motor 10 according to an embodiment of the present invention will be explained. Note that, in the following explanation, the "axial direction" indicates the direction of an axis $O_1$ of the stator core 20 (i.e., the axis of the motor 10), while the "radial direction" indicates a direction along a radius of a circle centered about the axis $O_1$.

The motor 10 is an 8-pole, 36-slot motor includes a stator 11 and a rotor 12 rotatably supported at radially inside (inside in the radial direction) of the stator 11. The rotor 12 includes a columnar shaft 13 extending in the axial direction; and a plurality of magnets 14 fixed at radially outside (outside in the radial direction) of the shaft 13. The stator 11 includes a stator core 20 having a noncircular outside shape; and a coil (not shown) wound around the teeth of the stator core 20.

Next, referring to FIG. 2A and FIG. 2B, the stator core 20 according to the present embodiment will be explained. The stator core 20 is configured by stacking a plurality of core sheets 22, each of which is made from a rolled magnetic steel sheet. Each of the core sheets 22 has a decagonal shape. The stator core 20 includes a plurality of first core sheets 24 arranged at axially one side (one side in the axial direction) of the stator core 20; and a plurality of second core sheets 26 arranged at the other side in the axial direction of the first core sheets 24. The first core sheets 24 and the second core sheets 26 have the same outside edge shapes.

Next, referring to FIG. 3A and FIG. 3B, the configurations of the first core sheet 24 and the second core sheet 26 will be explained. The first core sheet 24 is a thin sheet member having a decagonal outside edge which is defined by a side 28, side 30, side 32, side 34, side 36, side 38, side 40, side 42, side 44, and side 46. The side 28 and side 38 of the first core sheet 24 are arranged point symmetrically with respect to the axis $O_1$, and extend in the left-right direction in FIG. 3A so as to be parallel each other.

Figure 3A:
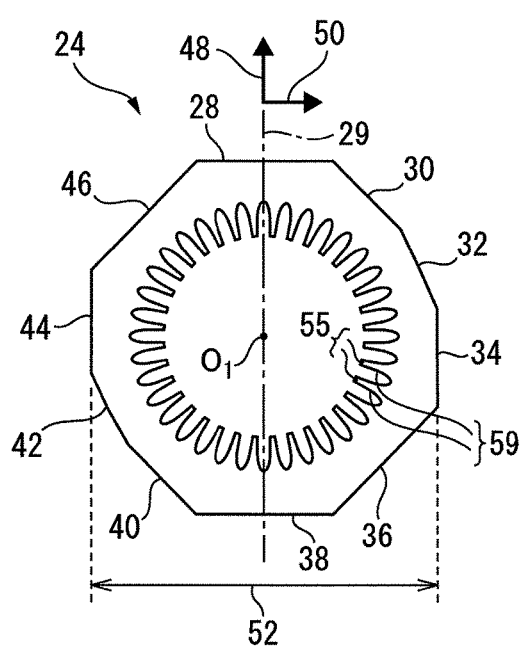
FIG. 3A and FIG. 3B are outside views of the first and second core sheets shown in FIG. 2A and FIG. 2B as seen from the axial direction.

The first core sheet 24 is made from a magnetic steel sheet rolled in the direction shown by the arrow 48 in FIG. 3A. That is, the first core sheet 24 has a rolling direction 48. This rolling direction 48 is a direction along an imaginary line 29 in FIG. 3A. The imaginary line 29 extends in the radial direction from the axis $O_1$ so as to pass through the centers of the sides 28 and 38.

The side 34 and side 44 of the first core sheet 24 are located at both ends in the direction 50 perpendicular to the rolling direction 48 of the first core sheet 24, and extend in the top-bottom direction in FIG. 3A so as to be parallel to the rolling direction 48. By these sides 34 and 44, the both ends of the first core sheet 24 in the direction 50 are defined. Therefore, the maximum dimension of the first core sheet 24 in the direction 50 is determined by the dimension 52 between the side 34 and the side 44.

The first core sheet 24 includes a plurality of teeth 55 at its inside edge, wherein the teeth 55 are formed so as to be aligned at equal intervals in the circumferential direction. A slot 59 is formed between two teeth 55 adjoining each other in the circumferential direction. A coil is wound around each of the teeth 55. In the present embodiment, a total of 36 slots 59 are formed by the total 36 teeth 55.

The second core sheet 26 has a shape the same as the first core sheet 24. Specifically, the second core sheet 26 is a thin sheet member having a decagonal outside edge which is defined by a side 54, side 56, side 58, side 60, side 62, side 64, side 66, side 68, side 70, and side 72. The side 54, side 56, side 58, side 60, side 62, side 64, side 66, side 68, side 70, and side 72 of the second core sheet 26 respectively correspond to the side 28, side 30, side 32, side 34, side 36, side 38, side 40, side 42, side 44, and side 46 of the first core sheet 24.

Figure 3B:
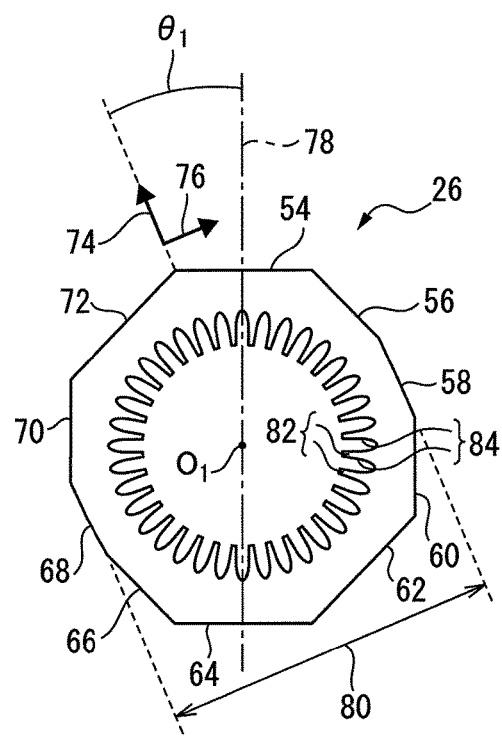

Here, the second core sheet 26 is made from a magnetic steel sheet rolled in the direction shown by the arrow 74 in FIG. 3B. That is, the second core sheet 26 has a rolling direction 74. This rolling direction 74 is a direction rotated from the imaginary line 78 in FIG. 3B about the axis $O_1$ by a predetermined angle $\theta_1$. The imaginary line 78 extends in the radial direction from the axis $O_1$ so as to pass through the centers of the side 54 and the side 64. Note that, the angle $\theta_1$ will be explained later.

The side 60 and side 70 of the second core sheet 26 are located at both ends in a direction perpendicular to the imaginary line 78 (same direction as the direction 50 in FIG. 3A), and extend in the top-bottom direction in FIG. 3B so as to be parallel to the imaginary line 78. On the other hand, the side 58 and the side 68 of the second core sheet 26 are located at both ends in a direction 76 perpendicular to the rolling direction 74 of the second core sheet 26, and extend in parallel to the rolling direction 74.

Therefore, the side 58 intersects the side 60 so as to form an angle of $(180°-\theta_1)$. Similarly, the side 68 intersects the side 70 so as to form an angle of $(180°-\theta_1)$. These side 58 and side 68 define the both ends of the second core sheet 26 in the direction 76. Therefore, the maximum dimension of the second core sheet 26 in the direction 76 is determined by the dimension 80 between the side 58 and the side 68.

In the present embodiment, the dimension 52 and the dimension 80 are set to be the same. Similar to the first core sheet 24, the second core sheet 26 has a total of 36 teeth 82 formed so as to be aligned at equal intervals in the circumferential direction. A total of 36 slots 84 are formed between the teeth 82 adjoining each other in the circumferential direction.

Figure 2A:
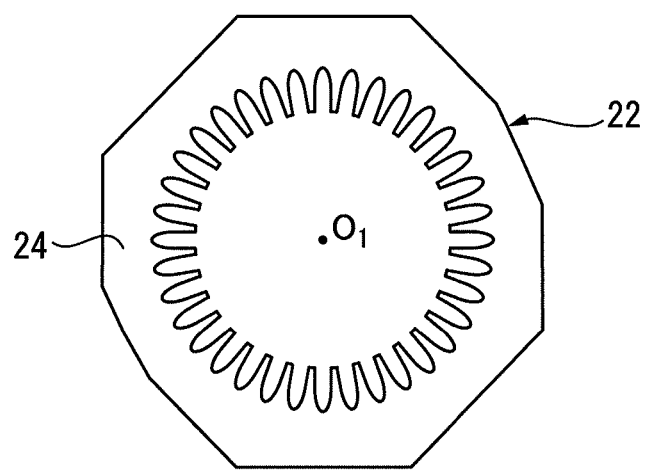
FIG. 2A is a view of the stator core shown in FIG. 1 as seen from the axial direction.
Figure 2B:
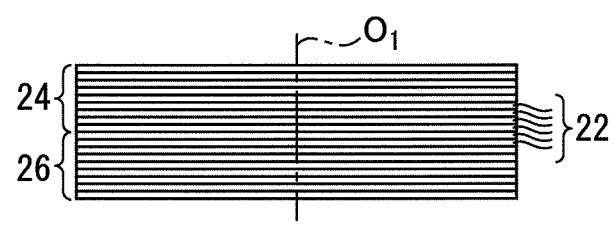
FIG. 2B is a view of the stator core shown in FIG. 2A as seen from radially outside.
Figure 4:
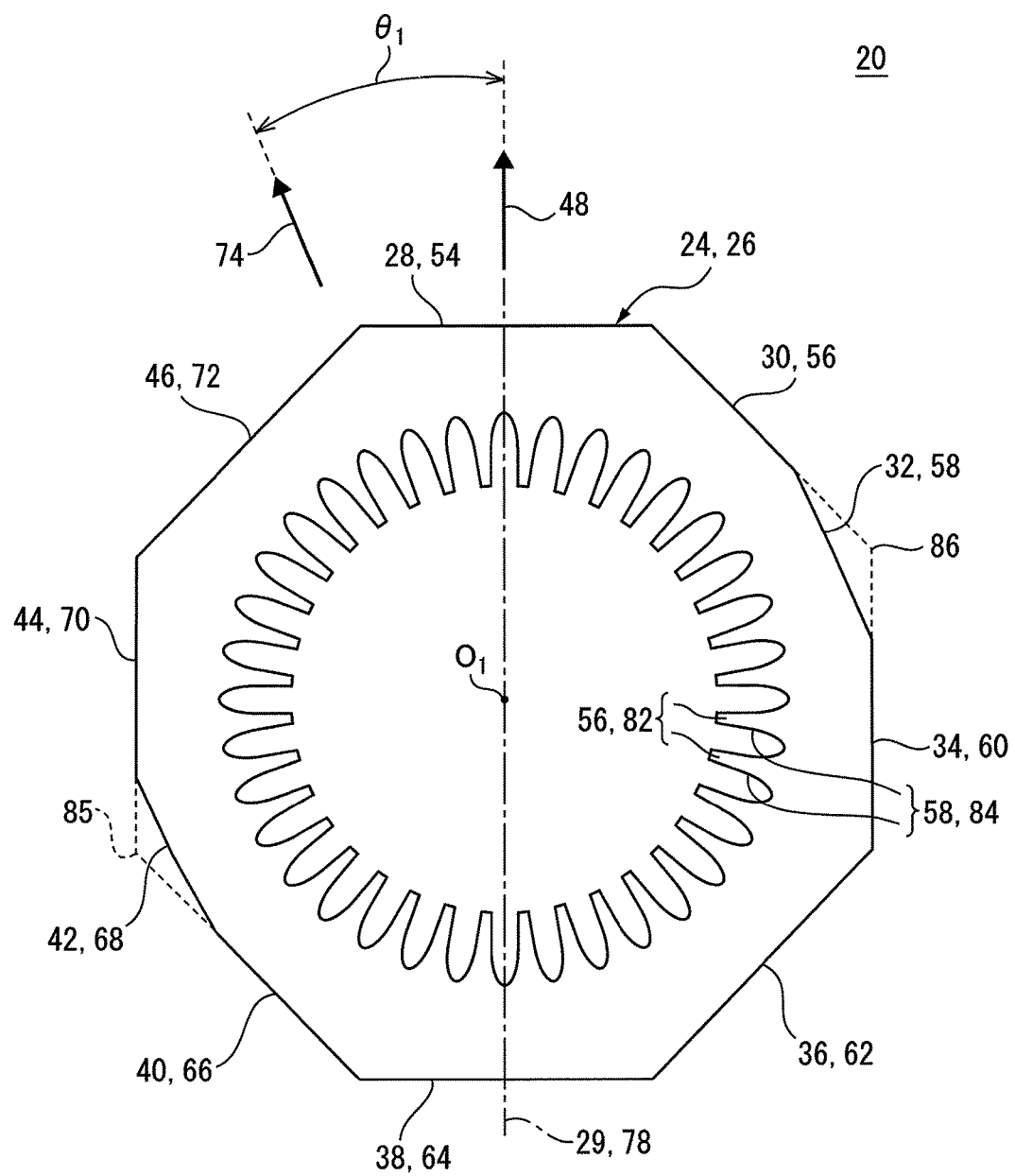
FIG. 4 is an enlarged view of the stator core shown in FIG. 2A.

The stator core 20 shown in FIGS. 2A and 2B is formed by stacking the first core sheets 24 and the second core sheets 26 in the axial direction so that the imaginary lines 29 and imaginary lines 78 shown in FIGS. 3A and 3B match with each other. By forming the stator core 20 in this way, the rolling directions 48 of the first core sheets 24 and the rolling directions 74 of the second core sheets 26 can be offset from each other in the circumferential direction by the angle $\theta_1$. This state is shown in FIG. 4. As shown in FIG. 4, the stator core 20 according to the present embodiment has the rolling directions 48, 74 different from each other by the angle $\theta_1$ in the circumferential direction.

This angle $\theta_1$ is defined as an equation: $\theta_1=(360°\times n_2)/(n_1\times 2)$. Here, $n_1$ is the number of poles of the motor 10, while $n_2$ is an odd number. By setting the angle $\theta_1$ in this way, it is possible to reduce the cogging torque which is generated dependent on the number of poles of the motor 10. For example, in the case of the present embodiment, the motor 10 has eight poles, that is, $n_1=8$. If $n_2=1$, the angle $\theta_1$ becomes 22.5°.

The decagonal outside edge shapes of the first core sheet 24 and the second core sheet 26 are formed based on regular octagonal shapes. Specifically, the outside edges of the first core sheet 24 and the second core sheet 26 are formed by trimming the parts shown by the broken lines in FIG. 4 from the outside edges of the regular octagonal shapes. That is, the vertexes 85 at the lower-left side in FIG. 4 of the regular octagonal shapes are trimmed to form the sides 42 and 68. Similarly, the vertexes 86 at the upper-right side in FIG. 4 of the regular octagonal shapes are trimmed to form the sides 32 and 58.

Next, referring to FIG. 5A to FIG. 6, a stator core 90 according to another embodiment of the present invention will be explained. Similar to the stator core 20 shown in FIG. 2A and FIG. 2B, the stator core 90 includes a plurality of first core sheets 92 stacked each other at axially one side of the stator core 90; and a plurality of second core sheets 94 stacked each other at the other side of the first core sheet 92 in the axial direction. The first core sheets 92 and the second core sheets 94 have the same outside edge shapes.

The first core sheet 92 is a thin sheet member having a decagonal outside edge which is defined by a side 96, side 98, side 100, side 102, side 104, side 106, side 108, side 110, side 112, and side 114. The first core sheet 92 is made from a magnetic steel sheet rolled in the direction shown by the arrow 116 in FIG. 5A. That is, the first core sheet 92 has a rolling direction 116.

Figure 5A:
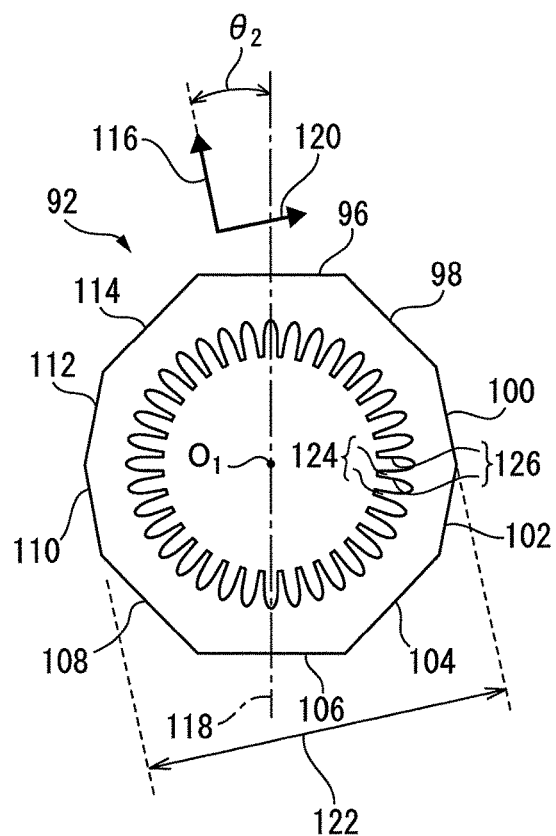
FIG. 5A shows a first core sheet of a stator core according to another embodiment of the present invention.

The rolling direction 116 is a direction rotated from the imaginary line 118 in FIG. 5A about the axis $O_1$ by a predetermined angle $\theta_2$ counterclockwise when seen from the front side of FIG. 5A. The imaginary line 118 extends from the axis $O_1$ in the radial direction so as to pass through the centers of the side 96 and side 106. The side 96 and side 106 are arranged point symmetrically with respect to the axis $O_1$.

The first core sheet 92 according to the present embodiment has an outside edge shape which is line symmetric about the imaginary line 118. Specifically, the side 114, side 112, side 110, and side 108 of the first core sheet 92 are respectively line symmetric to the side 98, side 100, side 102, and side 104 with respect to the imaginary line 118.

The side 100 and side 110 of the first core sheet 92 are located at both ends in the direction 120 perpendicular to the rolling direction 116 of the first core sheet 92, and extend so as to be parallel to the rolling direction 116. These side 100 and side 110 define the both ends of the first core sheet 92 in the direction 120.

Therefore, the maximum dimension of the first core sheet 92 in the direction 120 is determined by the dimension 122 between the side 100 and the side 110. Similar to the above-mentioned embodiment, the first core sheet 92 has a total of 36 teeth 124. Between the teeth 124, a total of 36 slots 126 are formed.

The second core sheet 94 has a shape the same as the first core sheet 92. Specifically, the second core sheet 94 is a thin sheet having a decagonal outside edge which is defined by a side 128, side 130, side 132, side 134, side 136, side 138, side 140, side 142, side 144, and side 146. The second core sheet 94 is made from a magnetic steel sheet rolled in the direction shown by an arrow 148 in FIG. 5B. That is, the second core sheet 94 has a rolling direction 148.

Figure 5B:
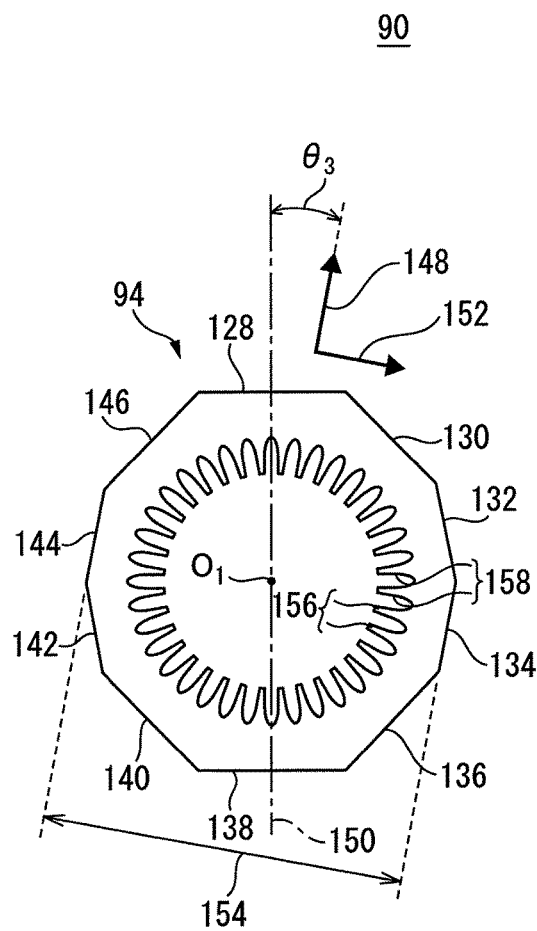
FIG. 5B shows a second core sheet of the stator core according to another embodiment of the present invention.

The rolling direction 148 is a direction rotated from the imaginary line 150 in FIG. 5B about the axis $O_1$ by a predetermined angle $\theta_3$ clockwise when seen from the front side of FIG. 5B. The imaginary line 150 extends from the axis $O_1$ in the radial direction so as to pass through the centers of the side 128 and side 138. The side 128 and side 138 are arranged point symmetrically with respect to the axis $O_1$.

The second core sheet 94 has an outside edge shape which is line symmetric about the imaginary line 150. Specifically, the side 146, side 144, side 142, and side 140 of the second core sheet 94 are respectively line symmetric to the side 130, side 132, side 134, and side 136 with respect to the imaginary line 150.

The side 134 and side 144 of the second core sheet 94 define both ends of the second core sheet 94 in the direction 152 perpendicular to the rolling direction 148, and extend in parallel with the rolling direction 148. The maximum dimension of the second core sheet 94 in the direction 152 is determined by the dimension 154 between the side 134 and the side 144 in the direction 152. Here, in the present embodiment, the dimension 122 and the dimension 154 are set to be the same. In the same way as the first core sheet 92, the second core sheet 94 has a total of 36 teeth 156. Between the teeth 156, a total of 36 slots 158 are formed.

By stacking the first core sheets 92 and the second core sheets 94 in the axial direction in the same way as the stator core 20 shown in FIG. 2A and FIG. 2B, in the stator core 90, the rolling direction 116 of the first core sheet 92 and the rolling direction 148 of the second core sheet 94 can be offset from each other by the angle $(\theta_2+\theta_3)$ in the circumferential direction. This state is shown in FIG. 6. As shown in FIG. 6, the stator core 90 according to the present embodiment has rolling directions 116 and 148 different from each other by the angle $(\theta_2+\theta_3)$ in the circumferential direction.

In the present embodiment, these angles $\theta_2$ and $\theta_3$ are defined as an equation: $\theta_2=\theta_3=(360°\times(n_3+0.5))/(n_1\times 2)$. Here, $n_1$ is the number of poles of the motor, while $n_3$ is an integer. By setting the angles $\theta_2$ and $\theta_3$ in this way, it is possible to reduce the cogging torque which is generated dependent on the number of poles of the motor 10. As a specific example, if making the number of poles of the motor $n_1$=8 and making $n_3$=0, the angles $\theta_2$ and $\theta_3$ become 11.25°. Therefore, the angle between the rolling directions 116 and 148 becomes 22.5°.

The octagonal outside edge shapes of the first core sheet 92 and the second core sheet 94 can be formed based on regular octagonal shapes. Specifically, the outside edges of the first core sheet 92 and the second core sheet 94 are formed by trimming the parts shown by the broken lines of FIG. 6 from the regular octagonal outside edges. That is, the vertexes 160 at the upper-right side in FIG. 6 of the regular octagonal shapes are trimmed whereby the sides 100 and 132 are formed.

Figure 6:
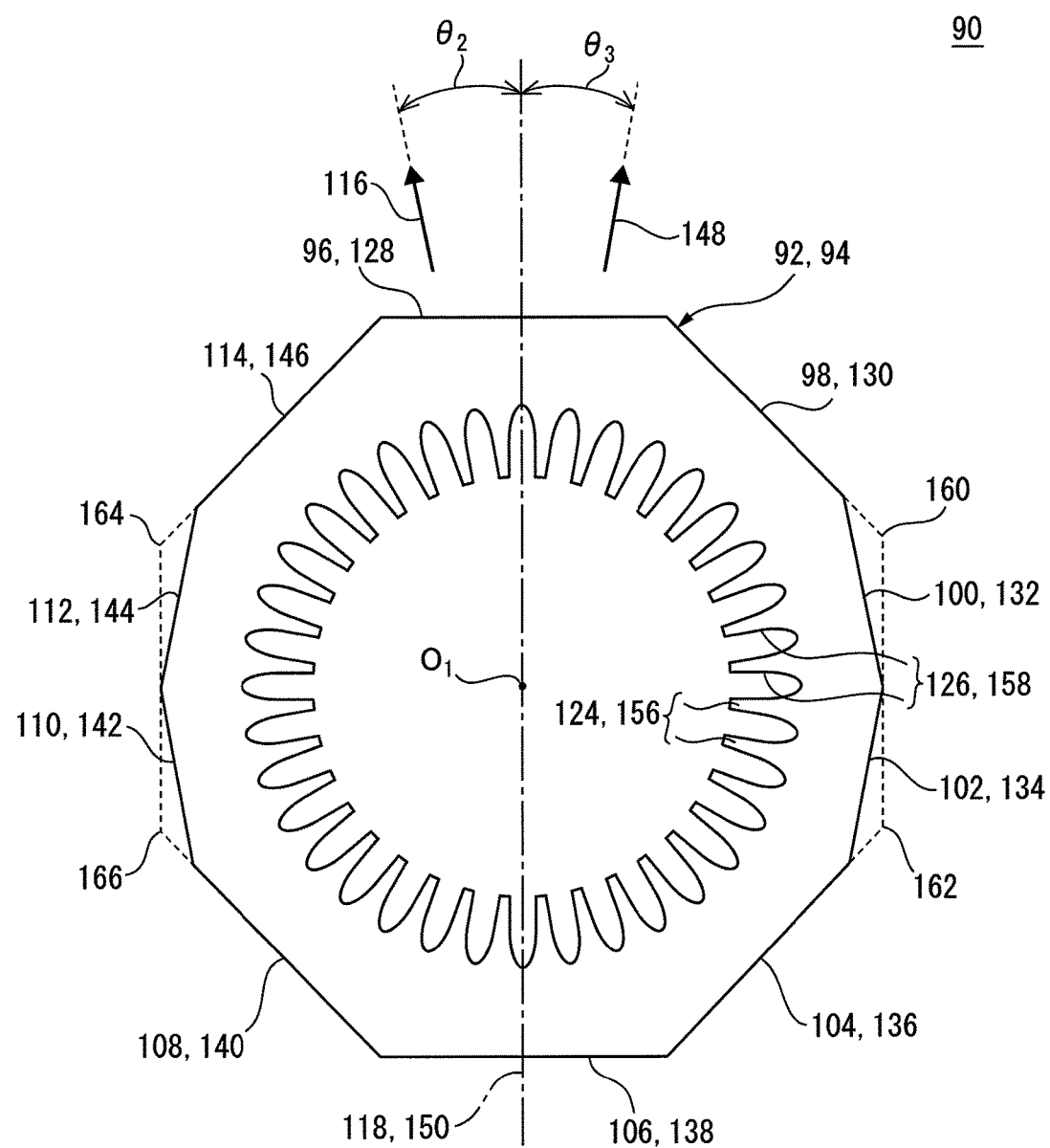
FIG. 6 is an outside view of the stator core formed by stacking the core sheets shown in FIG. 5A and FIG. 5B.

Similarly, the vertexes 162 at the lower-right side in FIG. 6 of the regular octagonal shapes are trimmed whereby the sides 102 and 134 are formed. Further, the vertexes 164 at the upper-left side in FIG. 6 of the regular octagonal shapes are trimmed whereby the sides 112 and 144 are formed. Further, the vertexes 166 at the lower-left side in FIG. 6 of the regular octagonal shapes are trimmed whereby the sides 110 and 142 are formed.

Next, referring to FIG. 7A and FIG. 7B, a stator core 170 according to still another embodiment of the present invention will be explained. The stator core 170 is configured by stacking a plurality of core sheets 172 in the axial direction, each of which is made from a rolled magnetic steel sheet. The plurality of core sheets 172 includes a plurality of the first core sheets 174 stacked each other at axially one side of the stator core 170; and a plurality of the second core sheets 176 stacked each other at the other side of the first core sheets 174 in the axial direction.

The first core sheet 174 includes an outer sheet 180 having a hole 178 at its center; and a first inner sheet 182 fit into the hole 178 so as to be arranged radially inside of the outer sheet 180. Further, the second core sheet 176 includes an outer sheet 180 the same as the first core sheet 174; and a second inner sheet 184 fit into the hole 178 so as to be arranged radially inside of the outer sheet 180.

Each of the outer sheets 180 included in each of the first core sheet 174 and the second core sheet 176 is a thin sheet having a regular octagonal outside edge, and includes a circular hole 178 having a predetermined diameter at its center. The outer sheets 180 are made from a magnetic steel sheet rolled in a predetermined direction.

Next, referring to FIG. 8A and FIG. 8B, the configurations of the first inner sheet 182 and the second inner sheet 184 according to the present embodiment will be explained. The first inner sheet 182 has a circular outside edge with a diameter the same as or slightly larger than the hole 178 of the outer sheet 180. Further, the first inner sheet 182 has a total of 36 teeth 186 formed at the inside edge so as to be aligned at equal intervals in the circumferential direction. A total of 36 slots 188 are formed between the teeth 186 adjoining each other in the circumferential direction.

The first inner sheet 182 is made from a magnetic steel sheet rolled in the direction shown by the arrow 190 in FIG. 8A. That is, the first inner sheet 182 has a rolling direction 190. This rolling direction 190 is a direction along an imaginary line 192 in FIG. 8A. The imaginary line 192 extends from the axis $O_1$ in the radial direction so as to pass through the centers of the two slots 188a and 188b which are arranged so as to be point symmetric to each other with respect to the axis $O_1$.

The second inner sheet 184 has the same shape as the first inner sheet 182. Specifically, the second inner sheet 184 has a circular outside edge with the same diameter as the first inner sheet 182, and includes a total of 36 teeth 194 at its inside edge. Between these teeth 194, a total of 36 slots 196 are formed.

The second inner sheet 184 is made from a magnetic steel sheet rolled in the direction shown by the arrow 198 in FIG. 8B. That is, the second inner sheet 184 has the rolling direction 198. The rolling direction 198 is a direction rotated from the imaginary line 199 in FIG. 8B about the axis $O_1$ by a predetermined angle $\theta_4$. The imaginary line 199 extends from the axis $O_1$ in the radial direction so as to pass through the centers of two slots 196a and 196b which are arranged point symmetrically to each other with respect to the axis $O_1$.

Figure 7A:
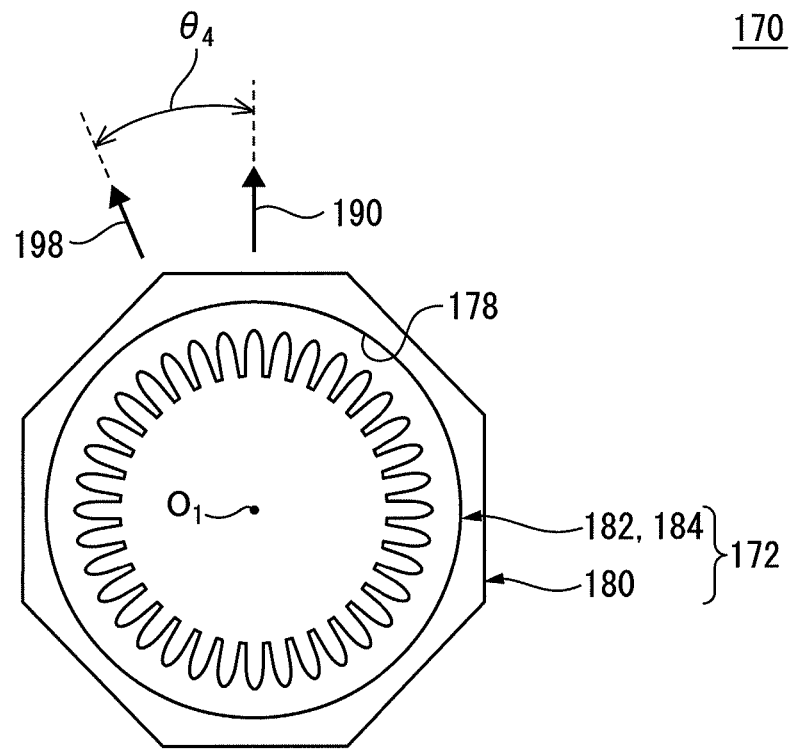
FIG. 7A is a view of a stator core according to still another embodiment of the present invention as seen from the axial direction.
Figure 7B:
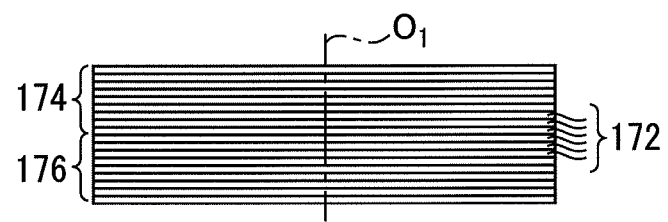
FIG. 7B is a view of the stator core shown in FIG. 7A as seen from radially outside.

As explained above, each of the first core sheets 174 shown in FIG. 7B is configured by fitting the first inner sheet 182 into the hole 178 of the outer sheet 180. Further, each of the second core sheets 176 is configured by fitting the second inner sheet 184 into the hole 178 of the outer sheet 180. Then these first core sheets 174 and second core sheets 176 are stacked in the axial direction, thereby the stator core 170 shown in FIG. 7A and FIG. 7B is formed.

At this time, the first core sheets 174 and the second core sheets 176 are stacked so that the imaginary lines 192 of the first inner sheets 182 shown in FIG. 8A and the imaginary lines 199 of the second inner sheets 184 shown in FIG. 8B match each other. By configuring the stator core 170 in this way, as shown in FIG. 7A, the rolling directions 190 of the first inner sheets 182 and the rolling directions 198 of the second inner sheets 184 can be offset from each other in the circumferential direction by an angle $\theta_4$.

Similar to the above-mentioned angle $\theta_1$, the angle $\theta_4$ is defined as the equation: $\theta_4=\theta_1=(360°\times n_2)/(n_1\times 2)$. By setting the angle $\theta_4$ in this way, it is possible to reduce the cogging torque which is generated dependent on the number of poles of the motor 10. For example, in the case of the present embodiment, the angle $\theta_4$ is 22.5°.

Next, referring to FIG. 9A and FIG. 9B, a stator core 200 according to still another embodiment of the present invention will be explained. The stator core 200 is configured by stacking a plurality of core sheets 202 in the axial direction, each of which is made from a rolled magnetic steel sheet. The plurality of core sheets 202 includes a plurality of first core sheets 204 stacked at axially one side of the stator core 200; and a plurality of second core sheets 206 stacked at the other side of the first core sheets 204 in the axial direction.

The first core sheet 204 includes an outer sheet 210 having a hole 208 at its center; and a first inner sheet 212 fit into the hole 208 so as to be arranged radially inside of the outer sheet 210. Further, the second core sheet 206 includes an outer sheet 210 the same as the first core sheet 204; and a second inner sheet 214 fit into the hole 208 so as to be arranged radially inside of the outer sheet 210. Each of the outer sheets 210 included in each of the first core sheet 204 and the second core sheet 206 is a thin sheet having a regular octagonal (i.e., regular "8"-gonal) outside edge, and includes a regular octadecagonal (i.e., regular "18"-gonal) hole 208 at its center. The outer sheet 210 is made from a magnetic steel sheet rolled in a predetermined direction.

Next, referring to FIG. 10A and FIG. 10B, the configurations of the first inner sheet 212 and the second inner sheet 214 according to the present embodiment will be explained. The first inner sheet 212 has a regular octadecagonal outside edge the same as or slightly larger than the hole 208 of the outer sheet 210. Further, the first inner sheet 212 has a total of 36 teeth 216 at its inside edge. A total of 36 slots 218 are defined between the teeth 216 adjoining each other in the circumferential direction.

Figure 10A:
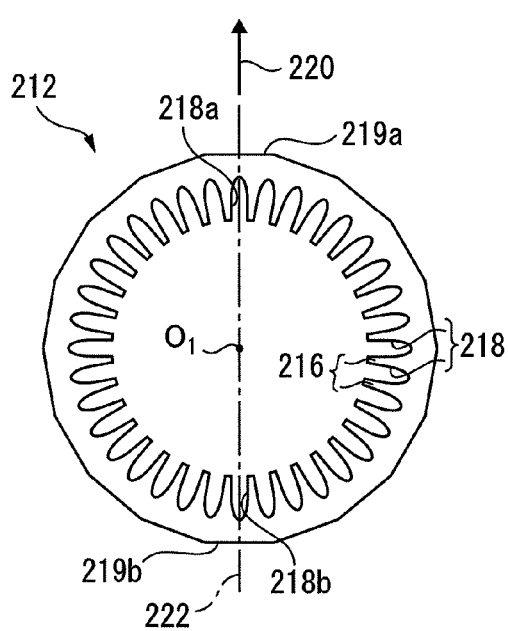
FIG. 10A shows the first inner sheet of the stator core shown in FIG. 9A.

The first inner sheet 212 is made from a magnetic steel sheet rolled in the direction indicated by the arrow 220 in FIG. 10A. That is, the first inner sheet 212 has the rolling direction 220. This rolling direction 220 is a direction along the imaginary line 222 in FIG. 10A. The imaginary line 222 extends in the radial direction from the axis $O_1$ so as to pass through the centers of the two slots 218a and 218b which are arranged point symmetrically to each other with respect to the axis $O_1$.

The second inner sheet 214 has a shape the same as the first inner sheet 212. Specifically, the second inner sheet 214 has the same regular octadecagonal outside edge as the first inner sheet 212, and includes a total of 36 teeth 224 at its inside edge. Between these teeth 224, a total of 36 slots 226 are defined.

In the present embodiment, since the number of slots is "36," the slots 226 of the second inner sheet 214 are aligned at equal intervals in the circumferential direction at angles of 10° about the axis $O_1$. More specifically, as shown in FIG. 10B, the angle $\theta_6$ between the imaginary line 230 and the imaginary line 232 is 10°. Here, the imaginary line 230 extends from the axis $O_1$ in the radial direction so as to pass through the centers of two slots 226a and 226b which are arranged point symmetrically to each other with respect to the axis $O_1$. Further, the imaginary line 232 extends from the axis $O_1$ in the radial direction so as to pass through the center of the slot 226c adjacent to slot 226a in one circumferential direction (counterclockwise direction as seen from front side of FIG. 10B).

Similarly, the angle $\theta_6$ between the imaginary line 232 and the imaginary line 234 is also 10°. The imaginary line 234 radially extends from the axis $O_1$ so as to pass through the center of the slot 226d adjacent to the slot 226c in one circumferential direction (counterclockwise direction as seen from front side of FIG. 10B).

Figure 10B:
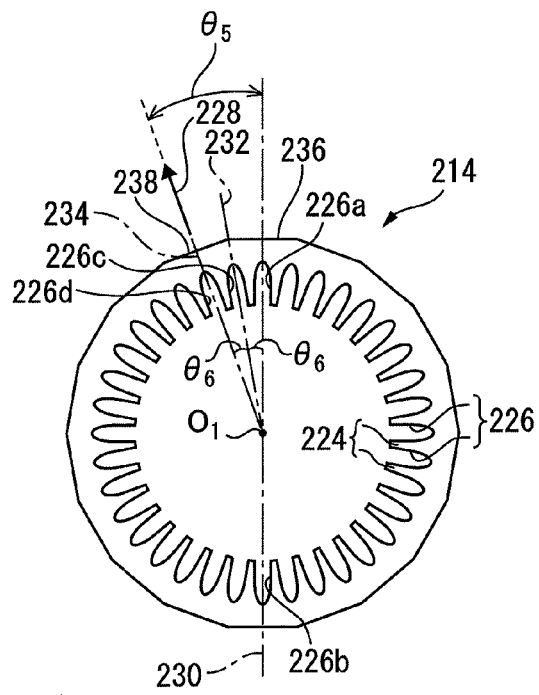
FIG. 10B shows the second inner sheet of the stator core shown in FIG. 9A.

Here, the second inner sheet 214 is made from a magnetic steel sheet rolled in a direction of the imaginary line 234, that is, the direction shown by the arrow 228 in FIG. 10B. Therefore, the rolling direction 228 of the second inner sheet 214 becomes a direction rotated from the imaginary line 230 by the angle $\theta_5=2\theta_6=20°$ about the axis $O_1$ in the circumferential direction.

As explained above, in the present embodiment, each of the hole 208 of the outer sheet 210, the first inner sheet 212, and the second inner sheet 214 has a regular octadecagonal shape (i.e., regular "18"-gonal shape). This number of "18" is determined by a method explained below.

Here, assume that the hole 208, the first inner sheet 212, and the second inner sheet 214 are regular $n_5$-gonal shapes ($n_5$ is a natural number). In this case, this natural number $n_5$ is selected to be one of divisors of the number of slots of the motor whereby the angle $\theta_7$ expressed by $\theta_7=360°/n_5$ becomes a value the closest to the angle $\theta_8$ expressed by $\theta_8=360°/(n_1\times 2)$. Here, $n_1$ shows the number of poles of the motor, as in the above-mentioned embodiment.

More specifically, since the number of slots is "36" in the present embodiment, the divisors thereof include 1, 2, 3, 4, 6, 9, 12, 18, and 36. Here, if making $n_5=12$, $\theta_7=30°$. Further, if $n_5=18$, $\theta_7=20°$. Further, if $n_5=36$, $\theta_7=10°$. On the other hand, the number of poles of the motor of the present embodiment is "8," so $\theta_8=22.5°$.

Therefore, as the number closest to this angle $\theta_8=22.5°$, $n_{5best}=18$ is selected, thereby each of the hole 208, the first inner sheet 212, and the second inner sheet 214 according to the present embodiment are formed into a regular octadecagon shape. The above-mentioned angle $\theta_5$ is set as $\theta_5=360°/n_{5best}=20°$ using the thus selected $n_{5best}=18$. Note that, the effect of this configuration will be explained later.

As explained above, each of the first core sheets 204 is configured by fitting a first inner sheet 212 into a hole 208 of an outer sheet 210. Further, each of the second core sheets 206 is configured by fitting a second inner sheet 214 into a hole 208 of an outer sheet 210. The stator core 200 shown in FIG. 9A and FIG. 9B is formed by stacking the first core sheets 204 and second core sheets 206 in the axial direction.

At this time, the first core sheets 204 and the second core sheets 206 are stacked so that the imaginary lines 222 of the first inner sheets 212 shown in FIG. 10A and the imaginary lines 230 of the second inner sheets 214 shown in FIG. 10B match with each other. By configuring the stator core 200 in this way, the rolling directions 220 of the first inner sheets 212 and the rolling directions 228 of the second inner sheets 214 can be offset in the circumferential direction from each other by the angle $\theta_5=20°$, as shown in FIG. 9A.

Next, referring to FIG. 11, an apparatus 250 for producing a motor according to an embodiment of the present invention will be explained. The apparatus 250 according to the present embodiment is for producing a motor 10 including a stator core 20 shown in FIGS. 1-4.

The apparatus 250 is provided with a first punch die 252; a first power generation apparatus 254 for driving the first punch die 252; a second punch die 256; a second power generation apparatus 258 for driving the second punch die 256; a rotation drive part 260 for rotating the second punch die 256 about the axis $O_2$ of the second punch die 256; and a controller 262 for controlling the first power generation apparatus 254, the second power generation apparatus 258, and the rotation drive part 260.

Figure 11:
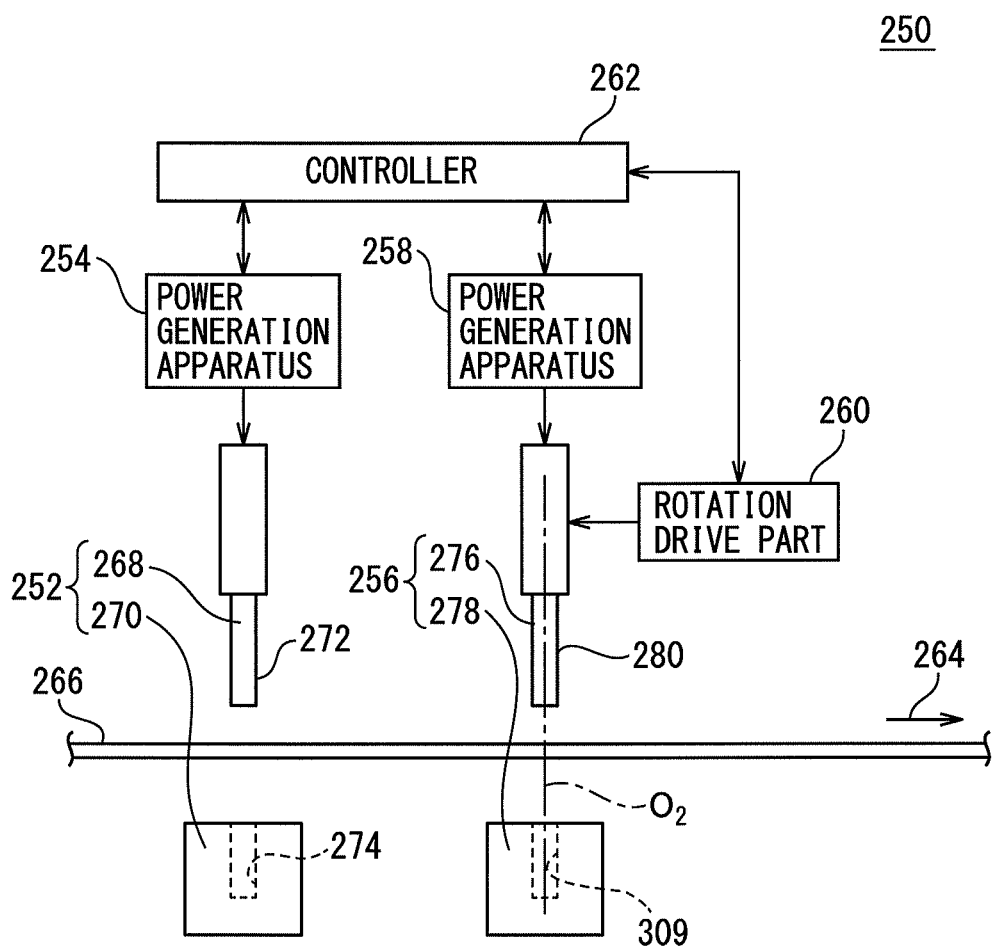
FIG. 11 is a schematic view of an apparatus for producing a motor, according to an embodiment of the present invention.

The first punch die 252 and the second punch die 256 are for press working the hoop 266 conveyed along the direction shown by the arrow 264 in FIG. 11. The hoop 266 is conveyed along the rolling direction. That is, the rolling direction of the hoop 266 and the conveying direction of the hoop 266 are the same.

The first punch die 252 is for forming the inside edge of the first core sheet 24, which includes the teeth 55 and slots 59 shown in FIG. 3A, and the inside edge of the second core sheet 26, which includes the teeth 82 and slots 84 shown in FIG. 3B. The first punch die 252 includes a punch 268 and a die 270 which receives the punch 268.

The punch 268 has an outer circumferential surface 272 corresponding to the inside edge shapes of the first core sheet 24 and the second core sheet. Further, the die 270 has an inner circumferential surface 274 corresponding to the outer circumferential surface 272 of the punch 268. The first power generation apparatus 254 is configured by e.g. a hydraulic cylinder, and drives the punch 268 toward the die 270 in response to a command from the controller 262.

The second punch die 256 is arranged at a downstream side of the first punch die 252, and punches out the first core sheet 24 and the second core sheet 26, each of which has a decagonal outside edge shown in FIG. 3A and FIG. 3B, from the hoop 266. The second punch die 256 includes a punch 276 and a die 278 which receives the punch 276.

Next, referring to FIG. 12A and FIG. 12B, the outer circumferential shape of the punch 276 of the second punch die 256 will be explained. The punch 276 is a rod-shaped member extending along the axis $O_2$, and has a decagonal outer circumferential surface 280. The shape of the outer circumferential surface 280 corresponds to the outside edge shapes of the first core sheet 24 and the second core sheet 26 shown in FIG. 3A and FIG. 3B.

Specifically, the outer circumferential surface 280 includes a flat surface 282, flat surface 284, flat surface 286, flat surface 288, flat surface 290, flat surface 292, flat surface 294, flat surface 296, flat surface 298, and flat surface 300. These flat surfaces 282, 284, 286, 288, 290, 292, 294, 296, 298, and 300 are respectively arranged so as to correspond to the sides 28, 30, 32, 34, 36, 38, 40, 42, 44, and 46 of the first core sheet 24. The arrows 264 in FIG. 12A and FIG. 12B show the conveying direction of the hoop 266. The punch 276 is arranged at the first position shown in FIG. 12A with respect to the conveying direction 264 at the initial stage.

More specifically, the punch 276 is arranged with respect to the conveying direction 264 so that the direction of the imaginary line 306 and the conveying direction 264 match when arranged at the first position. This imaginary line 306 corresponds to the above-mentioned imaginary line 29, and extends from the axis $O_2$ in the radial direction so as to pass through the centers of the flat surfaces 282 and 292.

Figure 12A:
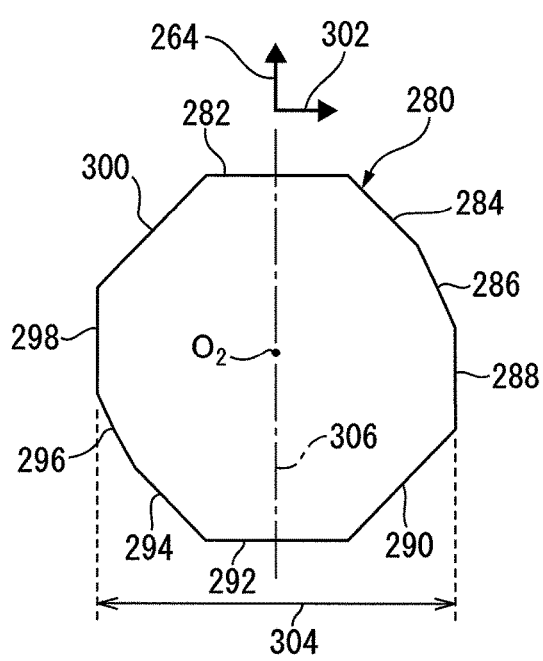
FIG. 12A is an outside view of a punch of the second punch die shown in FIG. 11 wherein the punch is arranged at a first position.

As shown in FIG. 12A, when the punch 276 is arranged at the first position, the flat surfaces 288 and 298 of the punch 276 define both ends of the punch 276 in the direction 302 perpendicular to the conveying direction 264. Further, the thus arranged flat surfaces 288 and 298 extend in the top-bottom direction of FIG. 12A so as to be parallel to the conveying direction 264. Therefore, when the punch 276 is arranged at the first position, the maximum dimension of the outer circumferential surface 280 of the punch 276 in the direction 302 is determined by the dimension 304 between the flat surfaces 288 and 298.

Figure 12B:
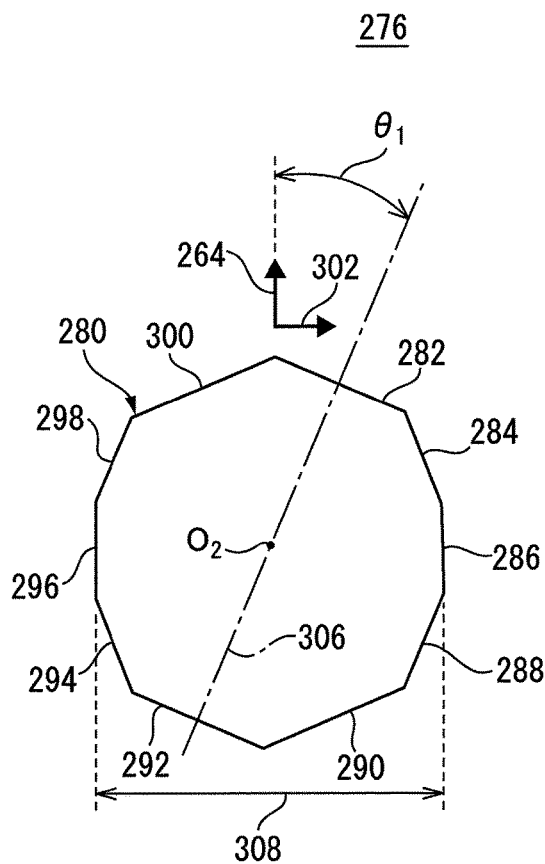
FIG. 12B shows the state wherein the punch shown in FIG. 12A is arranged at a second position.
Figure 13:
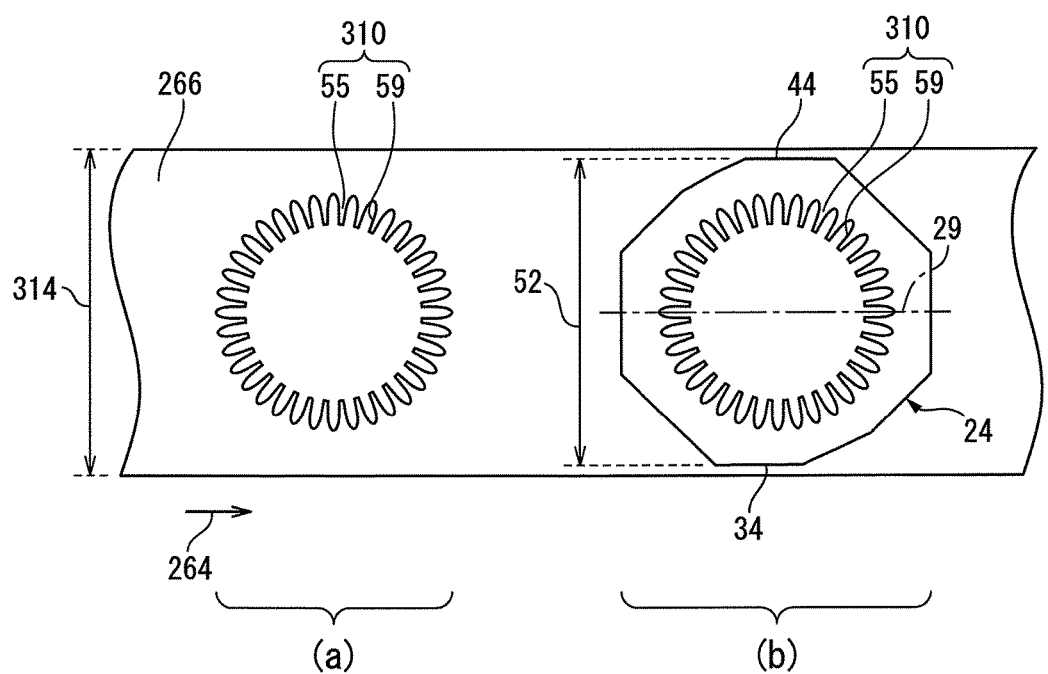
FIG. 13 is a view for explaining a step of producing a first core sheet with using the apparatus shown in FIG. 11.
Figure 14:
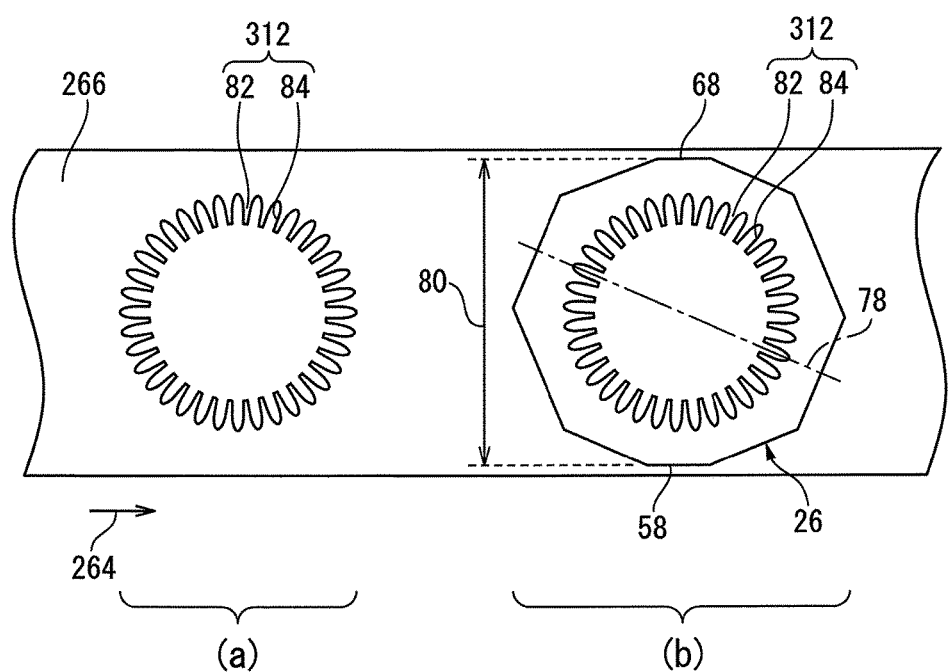
FIG. 14 is a view for explaining a step of producing a second core sheet with using the apparatus shown in FIG. 11.

The above-mentioned rotation drive part 260 rotates the punch 276 from the first position shown in FIG. 12A to the second position shown in FIG. 12B in the circumferential direction about the axis $O_2$ of the punch 276 by the above-mentioned angle $\theta_1$. When the punch 276 is arranged at the second position in this way, the flat surfaces 286 and 296 define both ends of the punch 276 in the direction 302. Further, the flat surfaces 286 and 296 in this arrangement extend in the top-bottom direction of FIG. 12B so as to be parallel to the conveying direction 264.

Therefore, when the punch 276 is arranged at the second position, the maximum dimension of the punch 276 in the direction 302 is determined by the dimension 308 between the flat surfaces 286 and 296. Here, the dimension 304 and the dimension 308 are set to be the same. The die 278 which receives the punch 276 has an inner circumferential surface 309 corresponding to the outer circumferential surface 280 of the punch 276. The rotation drive part 260 rotates the die 278 in synchronization with the punch 276 so as to become the same angle and direction as the punch 276.

Next, referring to FIG. 11 to FIG. 14, the operation of the apparatus 250 according to the present embodiment will be explained. The apparatus 250 punches a hoop 266 having a substantially constant width 314 so as to fabricate the first core sheets 24 and the second core sheets 26 shown in FIG. 3A and FIG. 3B. First, the controller 262 sends a command to the power generation apparatus 254 so as to drive the punch 268 of the first punch die 252 toward the die 270. Thereby, as shown in section (a) of FIG. 13, an inside edge 310 including teeth 55 and slots 59 is punched out from the hoop 266 conveyed in the conveying direction 264 by means of the first punch die 252.

Next, the controller 262 sends a command to the power generation apparatus 258 so as to drive the punch 276 of the second punch die 256 toward the die 278. Thereby, as shown in the section (b) of FIG. 13, the controller 262 punches out the first core sheet 24 from the hoop 266 by the second punch die 256 so as to enclose the inside edge 310 formed by the first punch die 252.

Next, the controller 262 sends a command to the rotation drive part 260 so as to rotate the punch 276 from the first position shown in FIG. 12A to the second position shown in FIG. 12B. Next, the controller 262 sends a command to the power generation apparatus 254 so as to drive the punch 268 of the first punch die 252 toward the die 270, thereby, as shown in section (a) of FIG. 14, an inside edge 312 including the teeth 82 and slots 84 is punched out from the hoop 266 by means of the first punch die 252.

Next, the controller 262 sends a command to the power generation apparatus 258 so as to drive the punch 276 of the second punch die 256 toward the die 278. Thereby, as shown in section (b) of FIG. 14, the controller 262 punches out the second core sheet 26 so as to enclose the inside edge 312 at the center from the hoop 266 by means of the second punch die 256.

As explained above, the maximum dimensions 52 and 80 of the first core sheet 24 and the second core sheet 26 in directions perpendicular to the conveying direction 264 (that is, the rolling directions 48 and 74) become the same. Due to this, it is possible to punch out the first core sheet 24 and the second core sheet 26 from the hoop 266 with the constant width 314, so it is possible to efficiently use the hoop 266 to fabricate the first core sheet 24 and the second core sheet 26. Due to this, it is possible to reduce the amount of waste of the hoop 266, so it is possible to produce the stator core 20 capable of reducing the cogging torque by a high efficiency while reducing the manufacturing costs.

Further, the sides 34 and 44 of the first core sheet 24 located at the both ends in the direction perpendicular to the conveying direction 264 extend in parallel to the conveying direction 264. In addition, the sides 58 and 68 of the second core sheet 26 located at the both ends in the direction perpendicular to the conveying direction 264 also extend in parallel to the conveying direction 264.

According to this configuration, it is possible to increase areas occupied by the first core sheet 24 and the second core sheet 26 in the width 314 of the hoop 266. Due to this, it is possible to more efficiently use the hoop 266, so it is possible to further reduce the amount of waste of the hoop 266.

Figure 15:
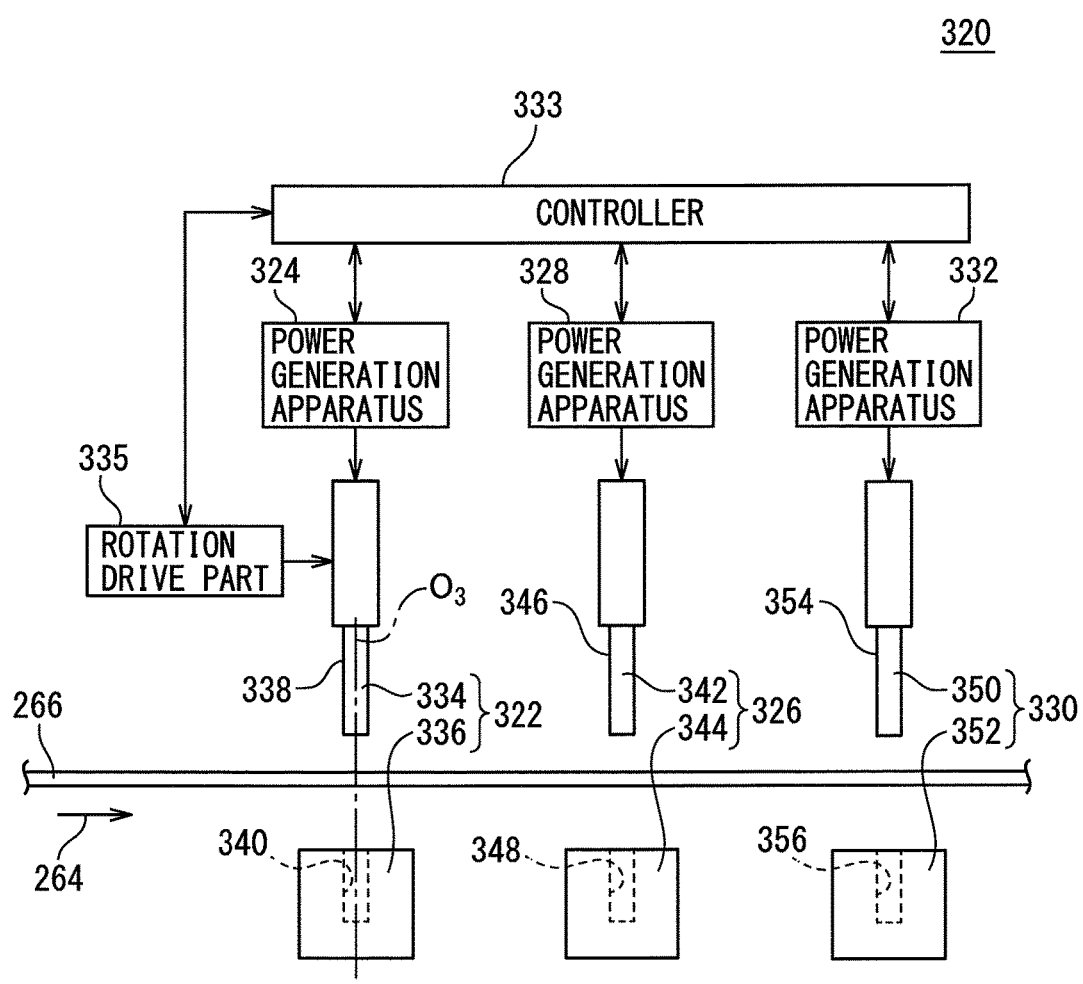
FIG. 15 is a schematic view of an apparatus for producing a motor, according to another embodiment of the present invention.
Figure 17:
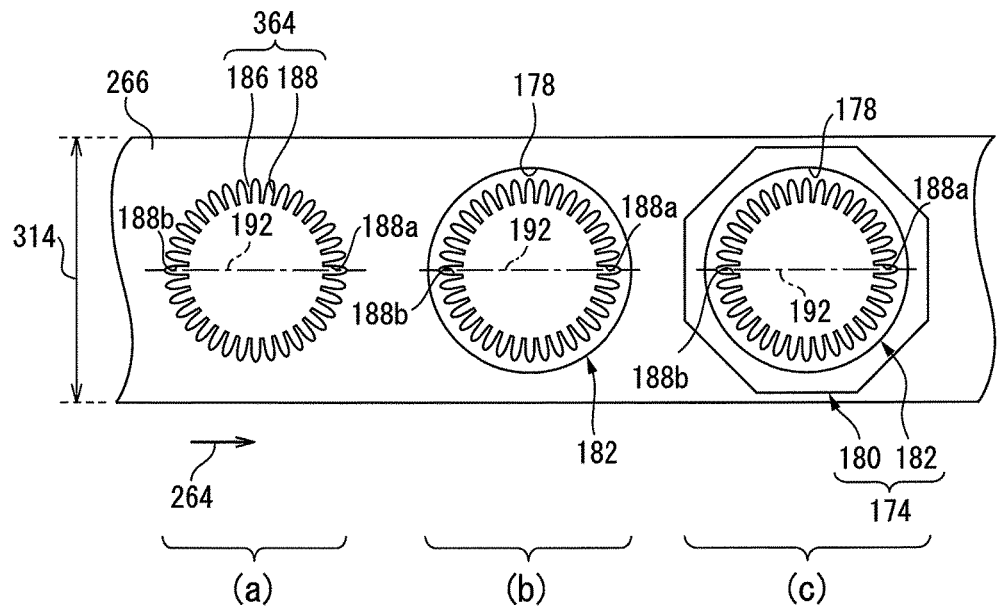
FIG. 17 is a view for explaining a step of producing a first core sheet with using the apparatus shown in FIG. 15.

Next, referring to FIG. 15, an apparatus 320 for producing a motor according to another embodiment of the present invention will be explained. The apparatus 320 according to the present embodiment is an apparatus for producing a motor including the stator core 170 shown in FIG. 7A to FIG. 8B.

The apparatus 320 includes a first punch die 322; a first power generation apparatus 324 which drives the first punch die 322; a second punch die 326; a second power generation apparatus 328 which drives the second punch die 326; a third punch die 330; a third power generation apparatus 332 which drives the third punch die 330; a rotation drive part 335 which rotates the first punch die 322; and a controller 333 which controls a first power generation apparatus 324, a second power generation apparatus 328, a third power generation apparatus 332, and the rotation drive part 335.

The first punch die 322, the second punch die 326, and the third punch die 330 are for press-working the hoop 266 conveyed in the conveying direction 264. The hoop 266 is conveyed along the rolling direction. The first punch die 322 is for forming the inside edges of the first inner sheet 182 and the second inner sheet 184, wherein the inside edge includes teeth 186, 194 and slots 188, 196 as shown in FIG. 8A and FIG. 8B. The first punch die 322 includes a punch 334 and a die 336 which receives the punch 334.

The punch 334 has an outer circumferential surface 338 which corresponds to the inside edge shapes of the first inner sheet 182 and the second inner sheet 184. Further, the die 336 has an inner circumferential surface 340 which corresponds to the outer circumferential surface 338 of the punch 334. The first power generation apparatus 324 is configured by e.g. a hydraulic cylinder, and drives the punch 334 toward the die 336 in response to a command from the controller 333.

The second punch die 326 is arranged at the downstream side of the first punch die 322, and punches out the first inner sheet 182 and the second inner sheet 184, each of which has a circular outside edge shown in FIG. 8A and FIG. 8B, from the hoop 266. The second punch die 326 includes a punch 342 having a circular outer circumferential surface 346; and a die 344 having a circular inner circumferential surface 348 which corresponds to the outer circumferential surface 346. The second power generation apparatus 328 drives the punch 342 toward the die 344 in response to a command from the controller 333.

The third punch die 330 is arranged at the downstream side of the second punch die 326, and punches out the outer sheet 180 having a regular octagonal outside edge as shown in FIG. 7A from the hoop 266. The third punch die 330 includes a punch 350 having a regular octagonal outer circumferential surface 354; and a die 352 having a regular octagonal inner circumferential surface 356 which corresponds to the outer circumferential surface 354. The third power generation apparatus 332 drives the punch 350 toward the die 352 in response to a command from the controller 333.

Next, referring to FIG. 16A and FIG. 16B, the punch 334 of the first punch die 322 will be explained. The punch 334 includes a circular shank 360 extending along the axis $O_3$; and a total of 36 ridges 362 projecting out from the shank 360 to radially outside and extending along the axis $O_3$. The ridges 362 have shapes corresponding to the slots 188 and 196 shown in FIG. 8A and FIG. 8B, and are aligned at equal intervals in the circumferential direction. Note that, the arrows 264 in FIG. 16A and FIG. 16B show the conveying direction 264 of the hoop 266.

At the initial stage, the punch 334 is arranged at the first position shown in FIG. 16A with respect to the conveying direction 264 of the hoop 266. More specifically, when arranged at the first position, the punch 334 is positioned relative to the conveying direction 264 so that the direction of the imaginary line 358 and the conveying direction 264 match each other. The imaginary line 358 radially extends from the axis $O_3$ so as to pass through the centers of two ridges 362a and 362b which are arranged point symmetrically to each other with respect to the axis $O_3$.

The rotation drive part 335 rotates the punch 334 about the axis $O_3$ in the circumferential direction from the first position shown in FIG. 16A to the second position shown in FIG. 16B by the above-mentioned angle $\theta_4$. Further, the rotation drive part 335 also rotates the die 336 in synchronization with the punch 334 so as to become the same rotational angle and direction as the punch 334.

Next, referring to FIG. 15 to FIG. 18, the operation of the apparatus 320 according to the present embodiment will be explained. The apparatus 320 punches out the first core sheet 174 and the second core sheet 176 shown in FIG. 7B from the hoop 266 having a constant width 314. First, the controller 333 sends a command to the power generation apparatus 324 so as to drive the punch 334 of the first punch die 322 toward the die 336. Thereby, as shown in section (a) of FIG. 17, the inside edge 364 including the teeth 186 and slots 188 is punched out from the hoop 266 conveyed in the conveying direction 264 by means of the first punch die 322.

Next, the controller 333 sends a command to the power generation apparatus 328 so as to drive the punch 342 of the second punch die 326 toward the die 344. Thereby, as shown in section (b) of FIG. 17, the controller 333 punches out a first inner sheet 182 so as to enclose the inside edge 364 at its center from the hoop 266 by means of the second punch die 326. Then, the punched out first inner sheet 182 is again fit into the hole 178 which is formed at the hoop 266 by punching out the first inner sheet 182. Note that, this hole 178 corresponds to the hole 178 of the outer sheet 180 shown in FIG. 7A.

Next, the controller 333 sends a command to the power generation apparatus 332 so as to drive the punch 350 of the third punch die 330 toward the die 352. Thereby, as shown in section (c) of FIG. 17, the controller 333 punches out the outer sheet 180 so as to enclose the hole 178, into which the first inner sheet 182 is fit, at its center, by means of the third punch die 330. As a result, the first core sheet 174 shown in FIG. 7B is fabricated.

Next, the controller 333 sends a command to the rotation drive part 335 so as to rotate the punch 334 of the first punch die 322 from the first position shown in FIG. 16A to the second position shown in FIG. 16B. Then, the controller 333 sends a command to the power generation apparatus 324 so as to drive the punch 334 toward the die 336. Thereby, as shown in section (a) of FIG. 18, the controller 333 punches out the inside edge 366 including teeth 194 and slots 196.

Next, the controller 333 sends a command to the power generation apparatus 328 so as to drive the punch 342 of the second punch die 326 toward the die 344. Thereby, as shown in section (b) of FIG. 18, the controller 333 punches out the second inner sheet 184 so as to enclose the inside edge 366 at its center. Then, the punched out second inner sheet 184 is rotated about the axis $O_1$ of the second inner sheet 184 counterclockwise as seen from the front side of FIG. 18 by the above-mentioned angle $\theta_4$.

Then, the rotated second inner sheet 184 is again fit into the hole 178 formed at the hoop by punching out the second inner sheet 184. The rolling direction 198 of the thus fit second inner sheet 184 becomes a direction rotated from the conveying direction 264 (i.e., direction of imaginary line 199) about the axis $O_1$ by the angle $\theta_4$, as shown in section (c) of FIG. 18.

Next, the controller 333 sends a command to the power generation apparatus 332 so as to drive the punch 350 of the third punch die 330 toward the die 352. Thereby, as shown in section (c) of FIG. 18, the controller 333 punches out the outer sheet 180 so as to enclose the hole 178, into which the second inner sheet 184 is fit, at its center, by means of the third punch die 330. As a result, the second core sheet 176 shown in FIG. 7B is fabricated.

Thus, according to the present embodiment, the core sheets 174 and 176, which constitute the stator core 170, are divided into regular octagonal outer sheets 180 and circular inner sheets 182 and 184, and stacked after rotating only the circular second inner sheets 184. Therefore, the outer sheets 180 are common members among the core sheets 174 and 176, so it is possible to punch out the outer sheets 180 from the hoop 266 of a constant width 314.

That is, when punching out the core sheets 174 and 176, it is possible to make the maximum dimensions of the core sheets 174 and 176 in the direction perpendicular to the conveying direction 264 constant. Due to this, it is possible to efficiently use the hoop 266 to fabricate the first core sheet 174 and the second core sheet 176. Therefore, it is possible to reduce the amount of waste of the hoop 266, so it is possible to produce a stator core 170 capable of reducing the cogging torque at a high efficiency while reducing the manufacturing costs.

Figure 19:
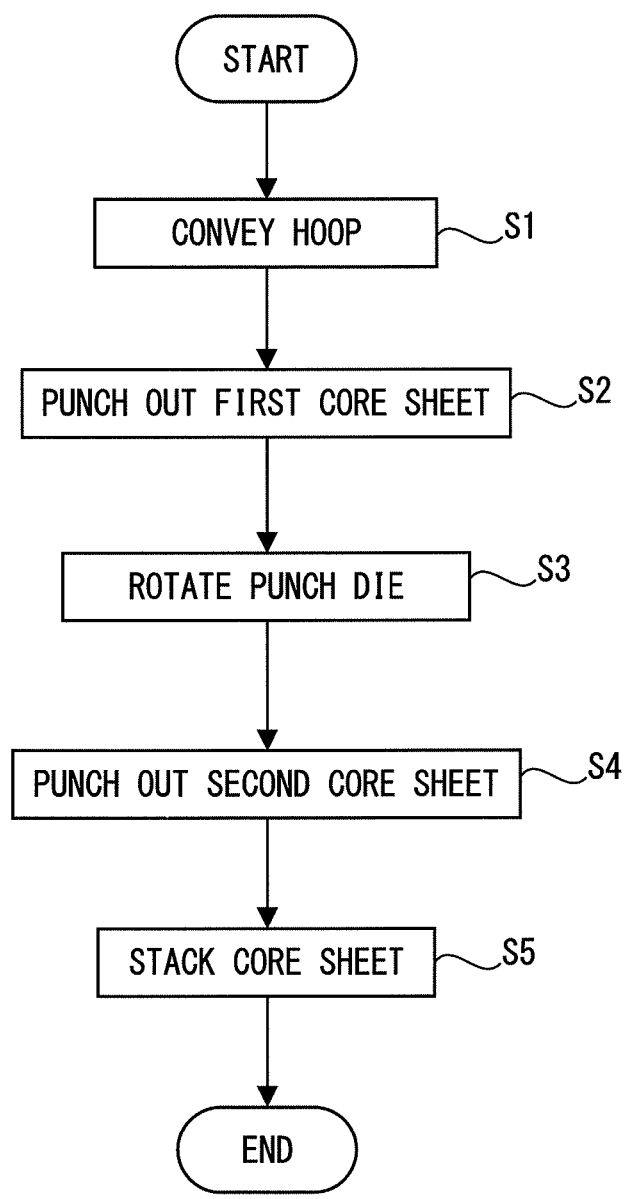
FIG. 19 is a flow chart of a method for producing a motor, according to an embodiment of the present invention.

Next, referring to FIG. 19, a method 400 of producing a motor according to an embodiment of the present invention will be explained. Note that, the method 400 according to the present embodiment is for producing the motor 10 including the stator core 20 shown in FIG. 1 to FIG. 4.

At step S1, a hoop 266 is conveyed in a conveying direction 264. For example, the hoop 266 is conveyed in the conveying direction 264 by a belt conveyor or other conveyance apparatus. At this time, the rolling direction of the hoop 266 and the conveying direction 264 match with each other.

At step S2, a first core sheet 24 is punched out from the hoop 266. For example, when fabricating the stator core 20 using the apparatus 250 shown in FIG. 11, at step S1, the controller 262 drives the first punch die 252 so as to form the inside edge 310 (section (a) of FIG. 13), and then drives the second punch die 256 so as to punch out the first core sheet 24 including the inside edge 310 (section (b) of FIG. 13).

At step S3, the second punch die 256 is rotated. Specifically, the controller 262 of the apparatus 250 sends a command to the rotation drive part 260 so as to rotate the punch 268 from the first position to the second position about the axis $O_2$.

At step S4, a second core sheet 26 is punched out from the hoop 266. Specifically, the controller 262 of the apparatus 250 drives the first punch die 252 so as to form the inside edge 312 (section (a) of FIG. 14), and then drives the second punch die 256 so as to punch out the second core sheet 26 including the inside edge 312 (section (b) of FIG. 14). At step S5, the first core sheets 24 and the second core sheets 26 are stacked each other, thereby the stator core 20 shown in FIG. 2A and FIG. 2B is produced.

Figure 20:
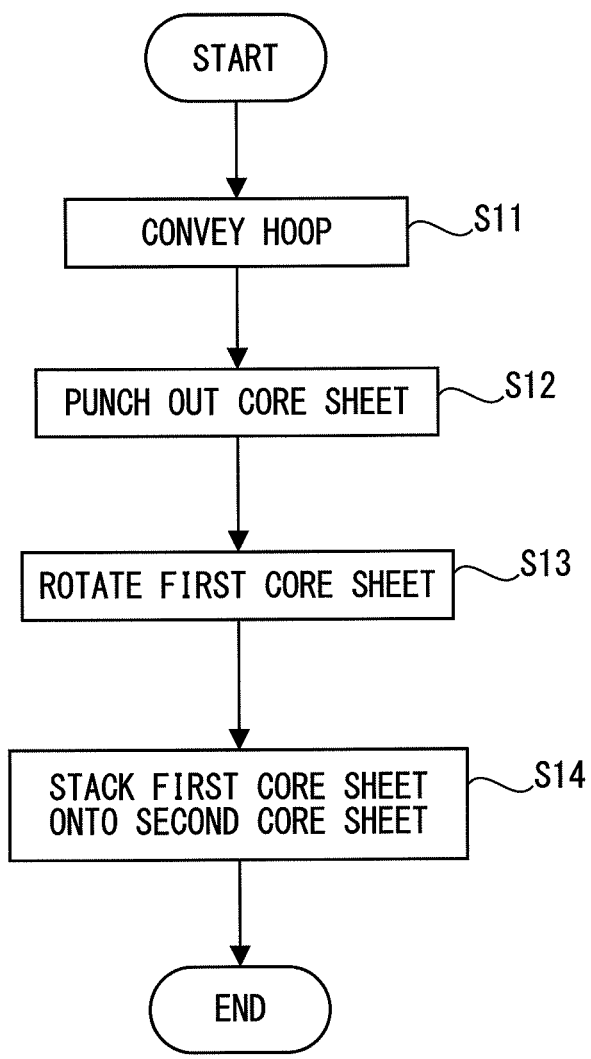
FIG. 20 is a flow chart of a method for producing a motor, according to another embodiment of the present invention.

Next, referring to FIG. 20, a method 410 of producing a motor according to another embodiment of the present invention will be explained. Note that, the method 410 according to the present embodiment is for producing a motor including a stator core 90 shown in FIG. 5A to FIG. 6.

At step S11, a hoop 266 is conveyed so that the conveying direction 264 and the rolling direction match with each other. At step S12, a plurality of core sheets 92 are punched out from the hoop 266. Specifically, each core sheet 92 is punched out by a punch die having a circumferential surface corresponding to the outside edge shape of the first core sheet 92 shown in FIG. 5A.

At this time, the punch die is rotated so that the imaginary line of the punch die, which corresponds to the imaginary line 118 shown in FIG. 5A, becomes a direction rotated from the conveying direction 264 of the hoop 266 (i.e., the rolling direction 116 of FIG. 5A) by the above-mentioned angle $\theta_2$ (=11.25°) about the axis of the punch die. Then, the core sheet 92 is punched out from the hoop 266 by the punch die positioned with respect to the conveying direction 264 as stated above.

At step S13, a part of the plurality of core sheets 92 punched out at step S12 is rotated 180° about the imaginary line 118. That is, the part of the core sheets 92 are flipped over at step S12. At step S14, the part of the core sheets 92 flipped over at step S13 is stacked at the core sheets 92 which are not flipped over.

Here, as explained above, the core sheet 92 shown in FIG. 5A has a shape which is line symmetric about the imaginary line 118. Therefore, by stacking flipped over core sheets 92 onto non-flipped over core sheets 92, the stator core 90 having the same outer circumferential surface as shown in FIG. 6 can be produced. In the stator core 90 produced by this method, the non-flipped over core sheet 92 corresponds to the above-mentioned first core sheet 92, while a flipped over core sheet 92 corresponds to the above-mentioned second core sheet 94.

According to the present embodiment, both the first core sheet 92 and the second core sheet 94 can be punched out from the hoop 266 with a constant width 314 by a punch die rotated relative to the conveying direction 264 by the angle $\theta_2$ (=11.25°). Accordingly, the maximum dimensions (i.e., dimensions 122 and 154) of the core sheets 92 and 94 in directions perpendicular to the conveying direction 264 can be made constant.

Therefore, it is possible to efficiently use the hoop 266, thereby reduce the amount of waste of the hoop 266. For this reason, it is possible to produce a stator core 90 capable of reducing the cogging torque with a high efficiency while reducing the manufacturing costs.

Figure 21:
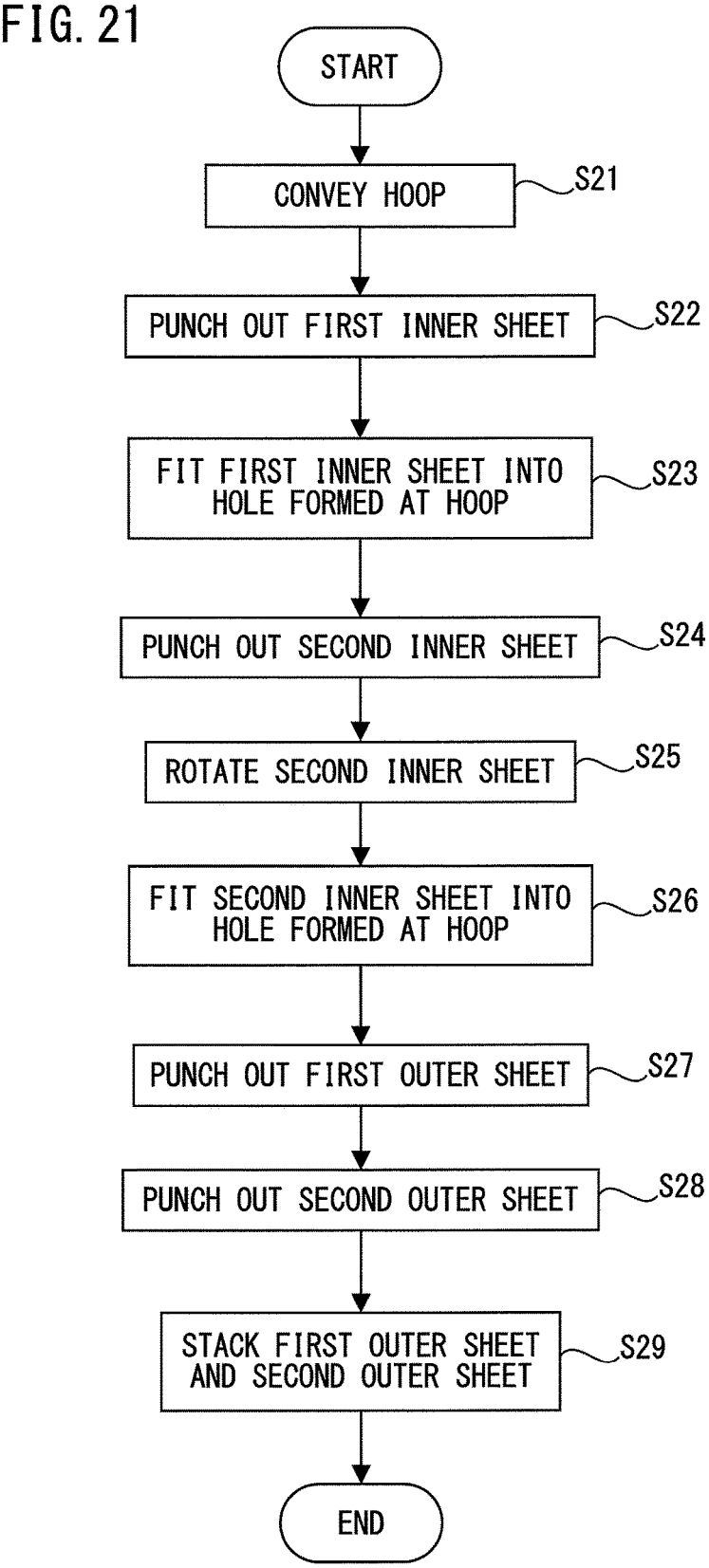
FIG. 21 is a flow chart of a method for producing a motor, according to still another embodiment of the present invention.

Next, referring to FIG. 21, a method 420 of producing a motor according to still another embodiment of the present invention will be explained. Note that, the method 420 according to the present embodiment is for producing a motor including the stator cores 170 and 200 shown in FIG. 7A to FIG. 10B.

At step S21, the hoop 266 is conveyed along the rolling direction in the conveying direction 264. At step S22, the first inner sheets 182 and 212 are punched out from the hoop 266. For example, when producing the stator core 170 with the apparatus 320 shown in FIG. 15, at step S22, the controller 333 of the apparatus 320 drives the first punch die 322 so as to form the inside edge 364 (section (a) of FIG. 17), and then drives the second punch die 342 so as to punch out the first inner sheet 182 including the inside edge 364 (section (b) of FIG. 17).

Figure 9A:
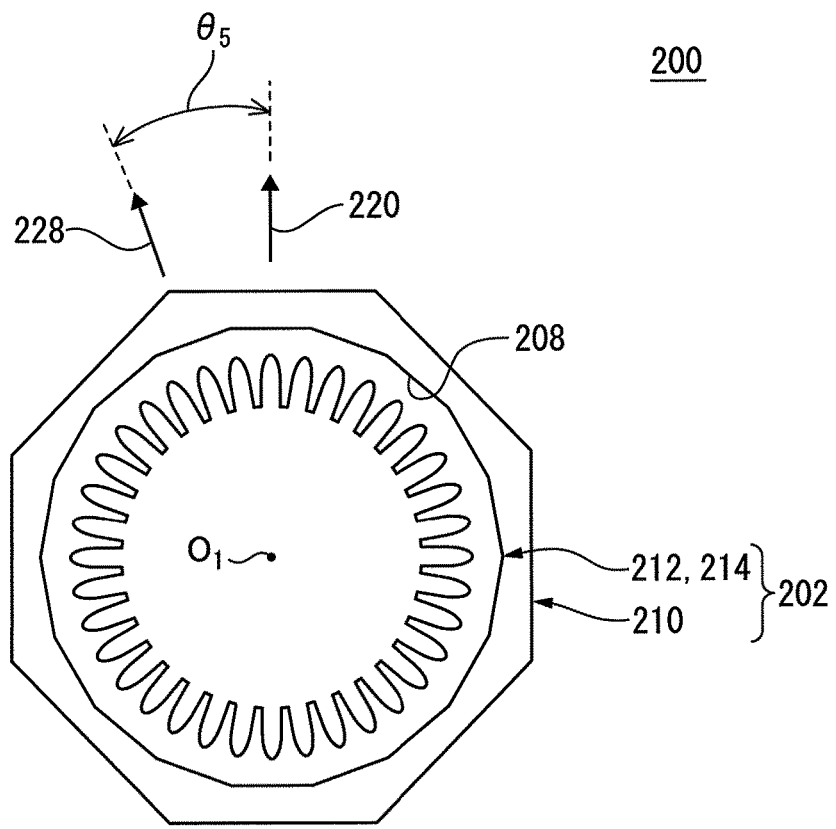
FIG. 9A is a view of a stator core according to still another embodiment of the present invention as seen from the axial direction.
Figure 9B:
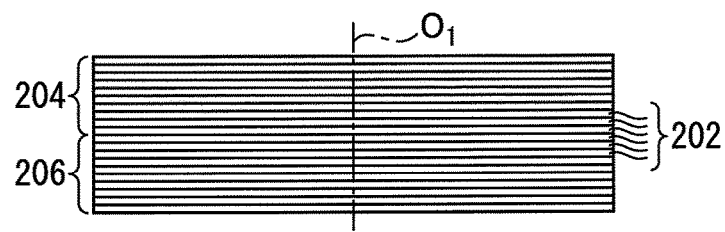
FIG. 9B is a view of the stator core shown in FIG. 9A as seen from radially outside.

On the other hand, when producing the stator core 200 shown in FIG. 9A and FIG. 9B, at step S22, the first inner sheet 212 having the regular octadecagonal outside edge shown in FIG. 10A is punched out by a first punch die having a regular octadecagonal circumferential surface.

At step S23, the first inner sheet 182, 212 is fit into the hole 178, 208 formed at the hoop 266 by punching out the first inner sheet 182, 212. For example, when producing the stator core 170 shown in FIG. 7A and FIG. 7B, the user again fits the first inner sheet 182 in the hole 178 formed at the hoop 266 by punching out the first inner sheet 182, as shown in section (b) of FIG. 17.

At step S24, the second inner sheet is punched out from the hoop 266. For example, when producing the stator core 170 shown in FIG. 7A and FIG. 7B, at step S24, the controller 333 of the apparatus 320 sends a command to the rotation drive part 335 so as to rotate the first punch die 322 from the first position to the second position. Then, the controller 333 drives the first punch die 322 to punch out the inside edge 366 (section (a) of FIG. 18) from the hoop 266.

Figure 18:
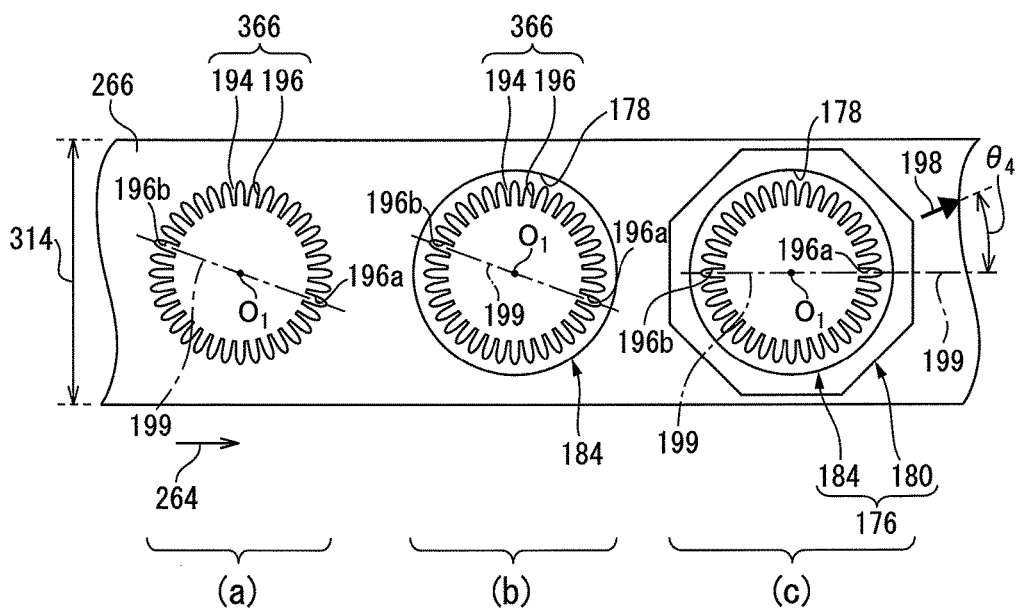
FIG. 18 is a view for explaining a step of producing a second core sheet with using the apparatus shown in FIG. 15.

Then, the controller 333 drives the second punch die 326 to punch out the second inner sheet 184 to enclose the inside edge 366 at its center (section (b) of FIG. 18). On the other hand, when producing the stator core 200 shown in FIG. 9A and FIG. 9B, at this step S24, an inner sheet having the same shape as the first inner sheet 212 by the same method as step S22.

At step S25, the second inner sheet is rotated about the center axis of the second inner sheet. Specifically, when producing the stator core 170 shown in FIG. 7A and FIG. 7B, the user rotates the second inner sheet 184, which was punched out at step S24, about the axis $O_1$ counterclockwise when viewed from the front side of FIG. 18 by the above-mentioned angle $\theta_4$. On the other hand, when producing the stator core 200 shown in FIG. 9A and FIG. 9B, the user rotates the inner sheet, which was punched out at step S24, about the axis of the inner sheet by the above-mentioned angle $\theta_5$ (=$2\theta_6$=20°).

At step S26, the second inner sheet, which was rotated at step S25, is fit into the hole 178, 208 formed in the hoop 266 at step S24. Specifically, when producing the stator core 170 shown in FIG. 7A and FIG. 7B, the user again fits the rotated second inner sheet 184 into the hole 178 formed at the hoop by punching out the second inner sheet 184, as shown in section (c) of FIG. 18. As a result, the second core sheet 176 shown in FIG. 7A, wherein the second inner sheet 184 is fit into the hole 178 of the outer sheet 180, can be fabricated.

On the other hand, when producing the stator core 200 shown in FIG. 9A and FIG. 9B, at step 26, the user fits the inner sheet which was rotated at step S25 into the hole 208 formed at the hoop at step S24. As a result, the second core sheet 206 shown in FIG. 9A, wherein the second inner sheet 214 is fit into the hole 208 of the outer sheet 210, can be fabricated.

At step S27, the first outer sheet 180, 210 is punched out. Specifically, when producing the stator core 170 shown in FIG. 7A and FIG. 7B, the controller 333 drives the third punch die 330 and punches out the outer sheet 180 so as to enclose the hole 178 at its center, into which the first inner sheet 182 is fit (section (c) of FIG. 17).

At step S28, the second outer sheet 180, 210 is punched out. Specifically, when producing the stator core 170 shown in FIG. 7A and FIG. 7B, the controller 333 of the apparatus 320 drives the third punch die 330 and punches out the outer sheet 180 so as to enclose the hole 178 at its center, into which the second inner sheet 184 is fit (section (c) of FIG. 18).

At step S29, the outer sheets 180, which were fabricated at step S27 and into which the first inner sheets 182, 212 are fit, and the other outer sheets 180, which were fabricated at step S28 and into which the second inner sheets 184 and 214 are fit, are stacked each other. As a result, the stator core 170 or 200 shown in FIG. 7A or FIG. 9A is produced.

When producing the stator core 200 shown in FIG. 9A and FIG. 9B by this method 420, at step S25, the inner sheets are rotated about the axis by the angle $\theta_5$. Here, this angle $\theta_5$ is an angle (=20°) set as a value the closest to the angle $\theta_7$=360°/($n_1$×2)=22.5° as explained above, and also matches with the exterior angle of a regular octadecagon (i.e., 20°).

Therefore, at step S25, in order to rotate the inner sheet by the angle $\theta_5$, the user can rotate the inner sheet by exactly the amount of the external angle of the regular octadecagon (i.e., equal to the angle between adjoining sides). Therefore, the user can easily understand the angle for rotation, thereby the operation becomes easy. Further, the angle $\theta_5$ is close to the angle $\theta_7$, so it is possible to reduce the cogging torque generated due to the number of poles of the motor.

Note that, when producing the stator core 200 shown in FIG. 9A and FIG. 9B, at step S25, the angle for rotating the inner sheets may be set as $(\theta_5 \times n_6)$ (n is any integer), and a plurality of $n_6$ may be applied to rotate the inner sheet by a plurality of different angles.

The thus configured stator core 200 includes a second inner sheet 214, the rolling direction 228 of which differs by 20° relative to the first inner sheet 212; a second inner sheet 214, the rolling direction 228 of which differs by 40° relative to the first inner sheet 212; a second inner sheet 214, the rolling direction 228 of which differs by 60° relative to the first inner sheet 212; . . . and a second inner sheet 214, the rolling direction 228 of which differs by $(\theta_5 \times n_6)°$ relative to the first inner sheet 212.

By configuring the stator core 200 in this way, it is possible to more effectively reduce the cogging torque. Further, in order to fabricate such a stator core 200, at step S25, the user may rotate the inner sheets by the angle $(\theta_5 \times n)$ when performing the n-th step S25. For example, the user may increase the angle for rotation of the inner sheet in accordance with the number of times of performing step S25 such as to 20° at first step S25, 40° at second step S25, . . . and $(\theta_5 \times n)°$ at n-th step S25.

Note that, in the above-mentioned embodiments, the case of stacking a plurality of first core sheets at one side in the axial direction and stacking a plurality of second core sheets at the other side of the first core sheets in the axial direction will be explained. However, the invention is not limited to this. The first core sheets and the second core sheets may be alternately stacked one at a time or may be stacked any number at a time.

Further, in the above-mentioned embodiments, the case of forming the stator core by stacking first core sheets each comprised of an outer sheet and a first inner sheet and second core sheets each comprised of an outer sheet and a second inner sheet was explained. However, the invention is not limited to this. The stator core need only be provided with outer sheets and first and second inner sheets which are arranged at the insides of the outer sheets in the radial direction. The thicknesses of the outer sheets and the first and the second inner sheets may also differ. That is, it is also possible to form a core sheet comprised of one outer sheet and one inner sheet.

As explained above, according to the present invention, it is possible to punch out the first core sheet and the second core sheet from a hoop of a constant width, so it is possible to efficiently use a hoop to fabricate the first core sheet and the second core sheet. For this reason, it is possible to reduce the amount of waste of the hoop, so it is possible to produce a stator core which can reduce the cogging torque at a high efficiency while reducing the manufacturing costs.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

Further, it should be noted that the operations, routines, steps, stages, and other processing in the apparatus, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then" etc. for convenience, this does not mean the execution in this order is essential.

The invention claimed is:

1. A motor comprising a stator core formed by stacking a plurality of noncircular core sheets, each of which is made from a rolled magnetic steel sheet, wherein
   the stator core includes:
      a first core sheet having a non-regular polygonal outside edge shape; and
      a second core sheet having an outside edge shape the same as the first core sheet, the second core sheet being stacked with respect to the first core sheet so that a rolling direction of the second core sheet becomes a direction rotated from a rolling direction of the first core sheet about a center axis of the stator core by an angle of an odd multiple of 360°/(number of poles of the motor×2), wherein
   the outside edge of the first core sheet is defined by:
   a first group of sides; and
   a second group of sides connected to the first group of sides, each of the second group of sides having a circumferential length less than the first group of sides, wherein
   the second group of sides includes a first and second sides at both ends in a direction perpendicular to the rolling direction of the first core sheet, the first and second sides being parallel to the rolling direction of the first core sheet, wherein
   the outside edge of the second core sheet is defined by:
   a third group of sides; and
   a fourth group of sides connected to the third group of sides, each of the fourth group of sides having a circumferential length less than the third group of sides, wherein the fourth group of sides includes a third and fourth sides at both ends in a direction perpendicular to the rolling direction of the second core sheet, the third and fourth sides being parallel to the rolling direction of the second core sheet, wherein
   a dimension in the direction perpendicular to the rolling direction of the first core sheet between the first side and the second side, and a dimension in the direction perpendicular to the rolling direction of the second core sheet between the third side and the fourth side are the same.

2. The motor according to claim 1, wherein each of the first and second core sheets has a shape which is line symmetric about an imaginary line radially extending from its center axis to a direction rotated from its rolling direction about the center axis of the stator core by an angle expressed by (360°×(a+0.5))/(number of poles of the motor×2) where "a" is a whole number.

3. A method of producing the motor according to claim 2 which includes the stator core, comprising:
   conveying a hoop along a rolling direction of the hoop;
   punching out a plurality of the core sheets from the hoop, each of the core sheets having a shape which is line symmetric about an imaginary line radially extending from the center axis of the core sheet to a direction rotated from the conveying direction of the hoop about the center axis of the core sheet by an angle expressed by (360°×(a+0.5))/(number of poles of the motor×2) where "a" is a whole number;

rotating a first core sheet of the plurality of core sheets about the imaginary line by 180°; and stacking the first core sheet on a second core sheet of the plurality of core sheets.

4. A method of producing the motor according to claim 1 which includes the stator core, comprising:

conveying a hoop along a rolling direction of the hoop;

punching out the first core sheet from the hoop;

punching out the second core sheet from the hoop; and stacking the first core sheet and the second core sheet each other so that the rolling direction of the second core sheet becomes a direction rotated from the rolling direction of the first core sheet about a center axis of the stator core by an angle of an odd multiple of 360°/(number of poles of the motor×2).

5. The method according to claim 4, wherein the steps of punching out the first core sheet and punching out the second core sheet are performed with a punch die, wherein the method further comprises rotating the punch die about a center axis of the punch die by an angle of an odd multiple of 360°/(number of poles of the motor×2), before punching out the second core sheet.

* * * * *